INVENTORS
W. MILES RYAN
JOHN W. BOLD
BY
ATTORNEYS

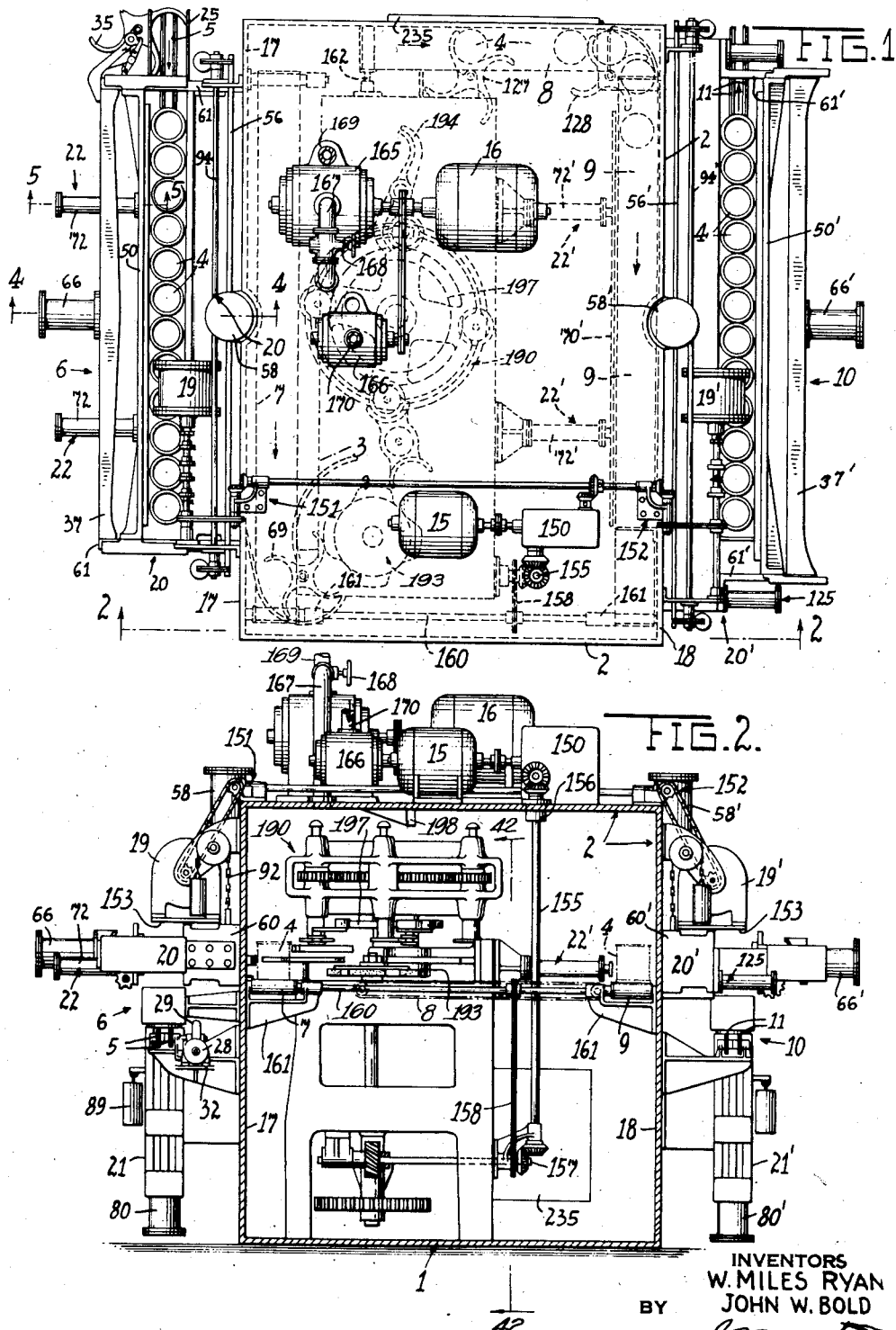

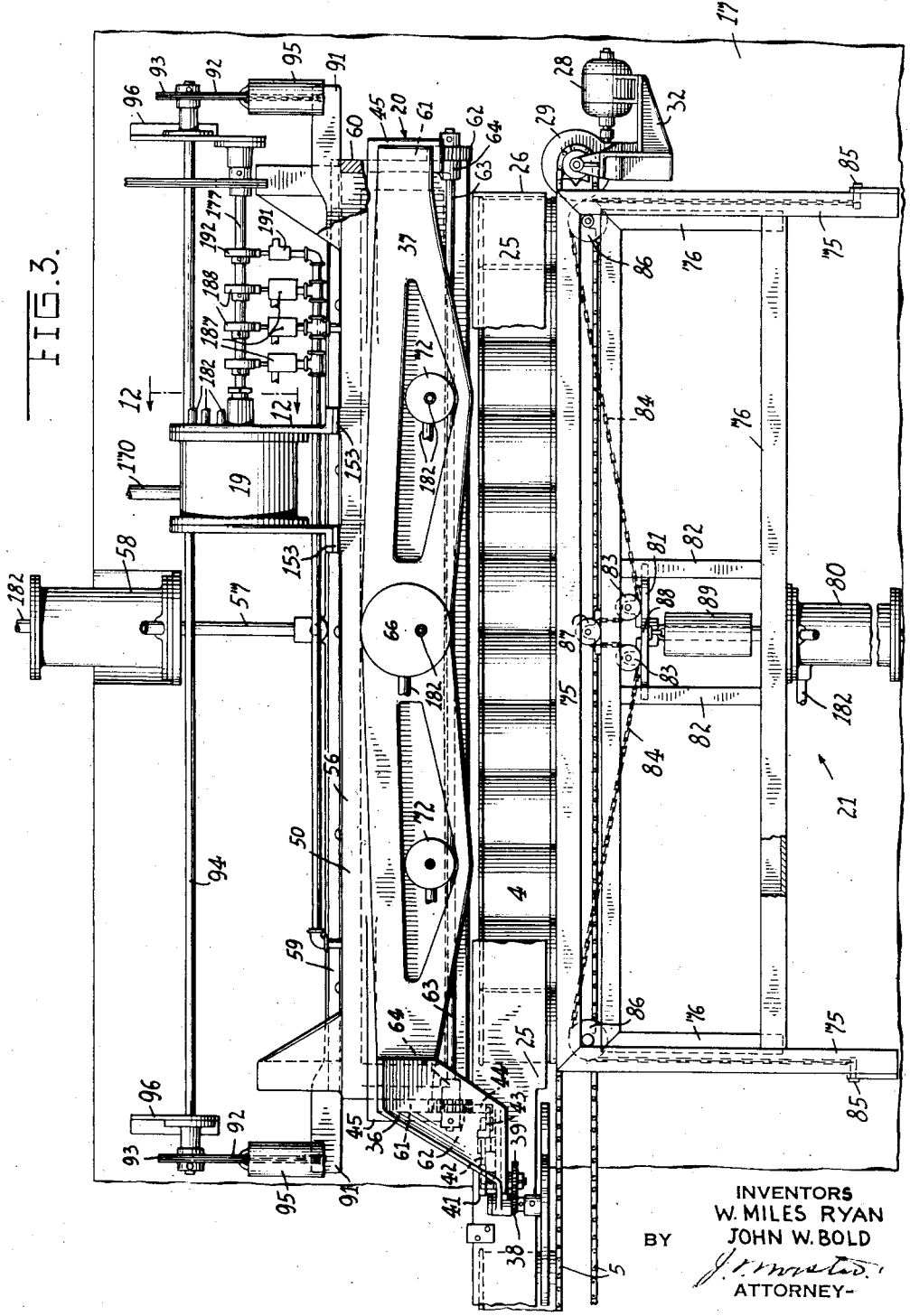

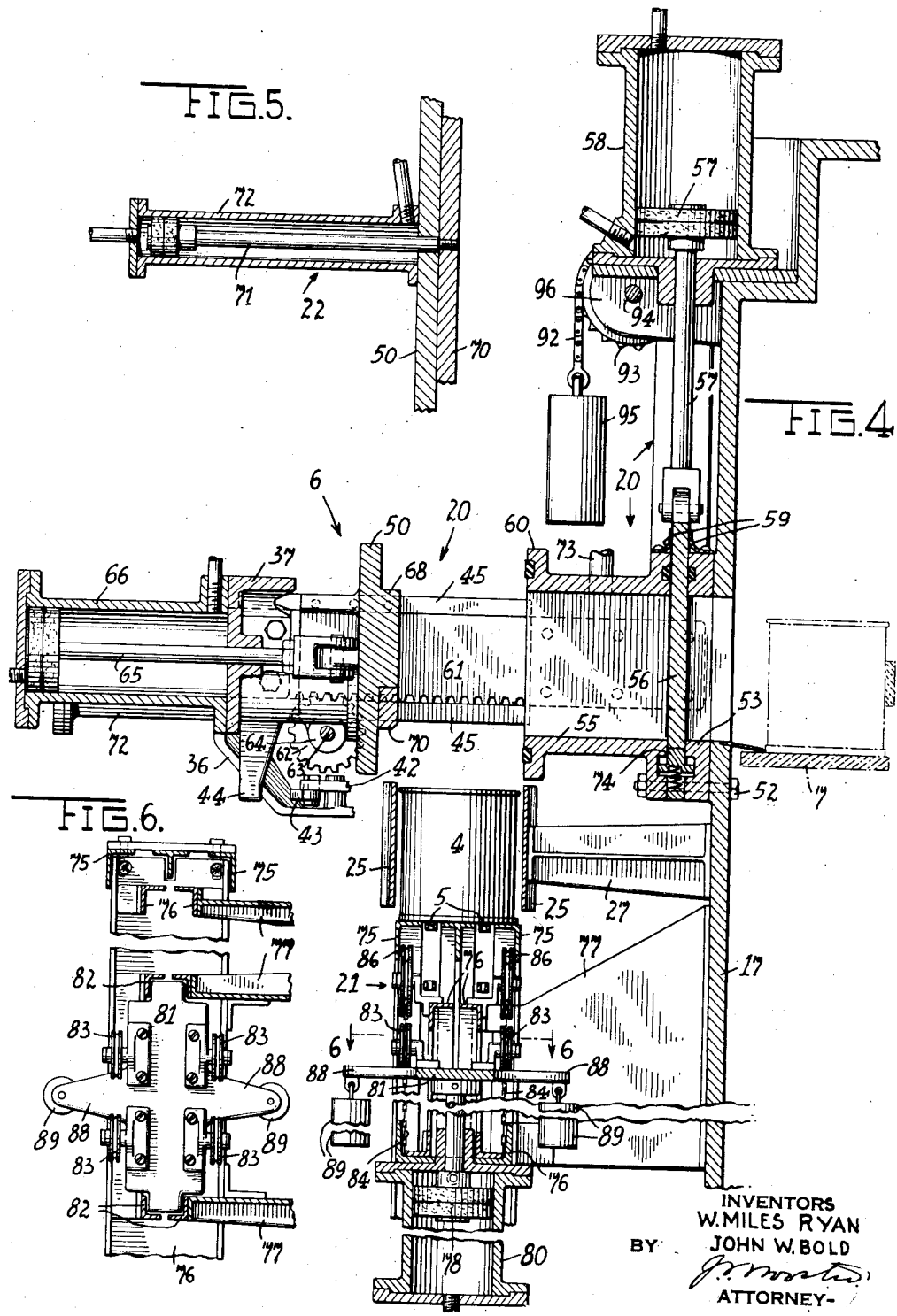

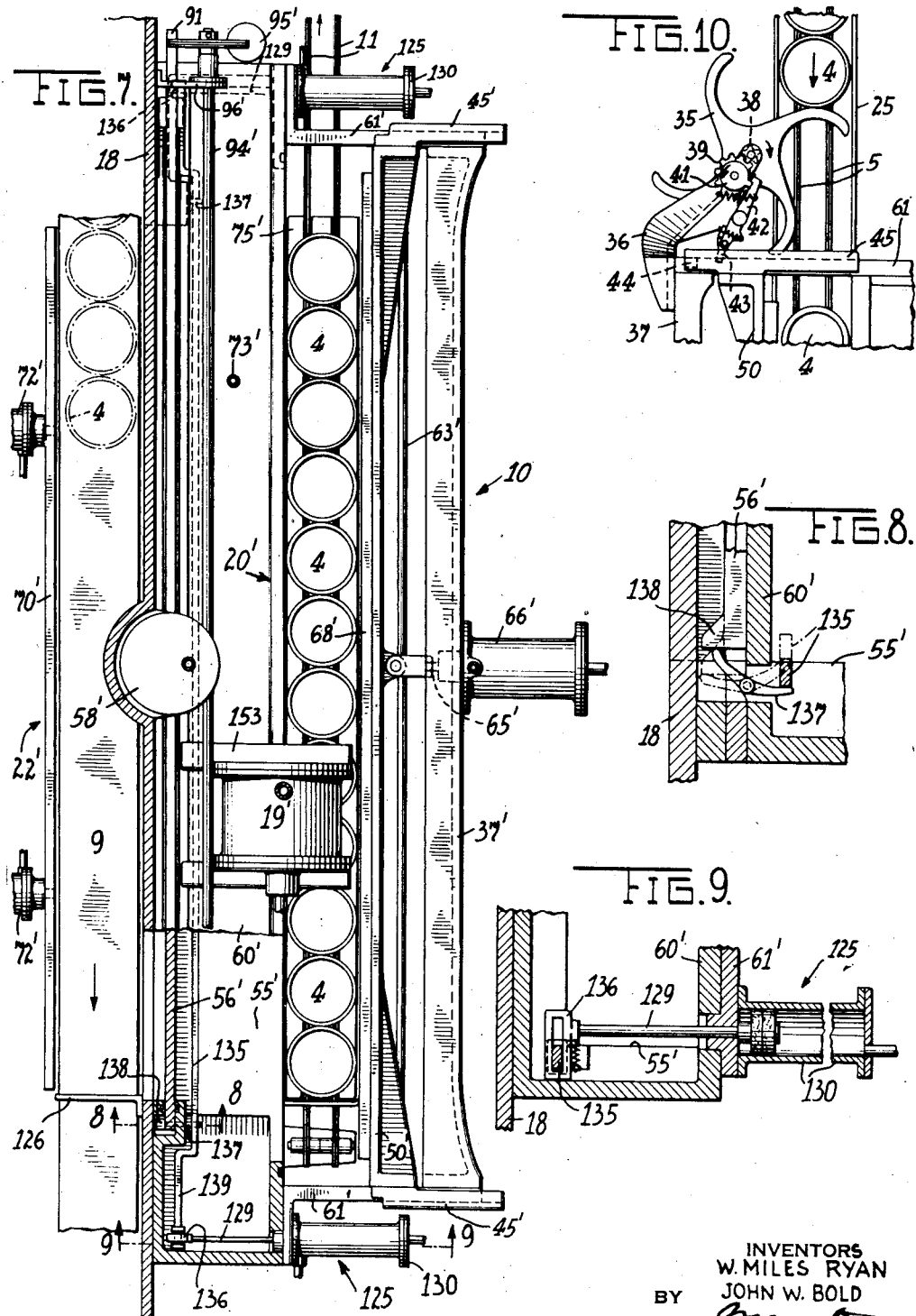

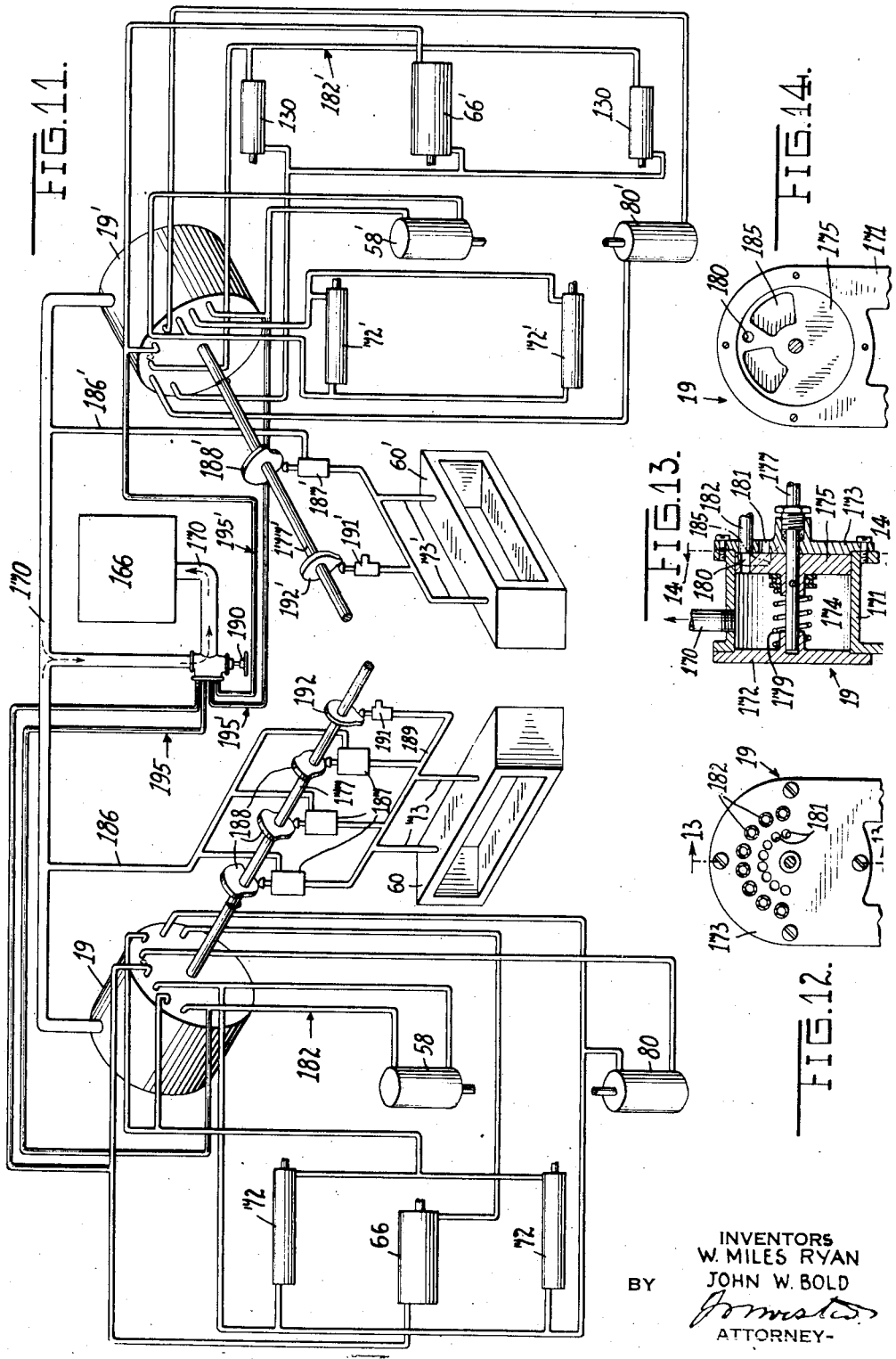

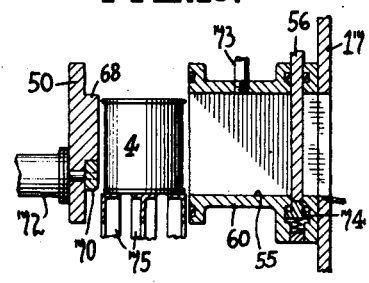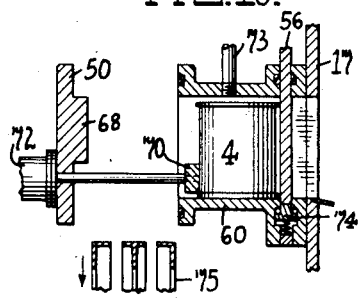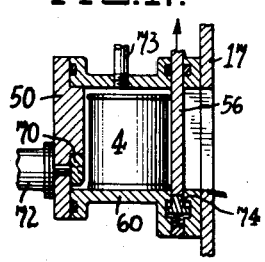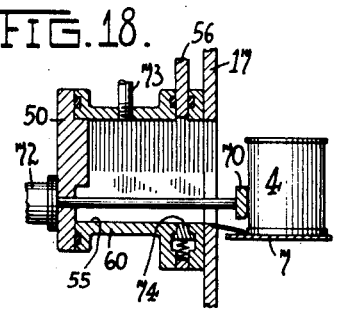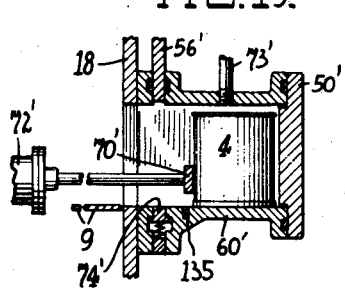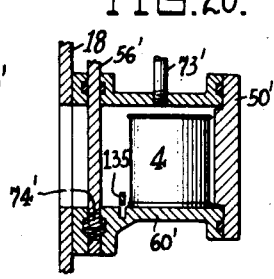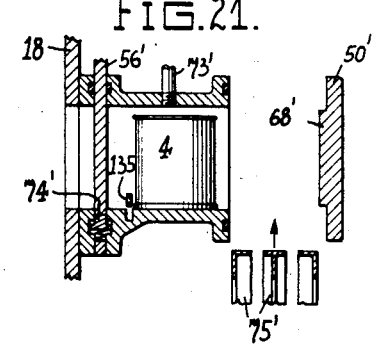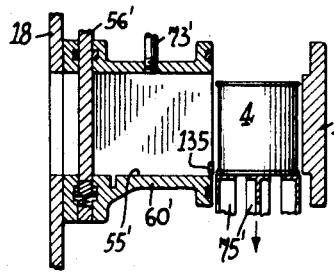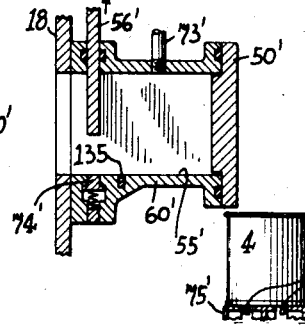

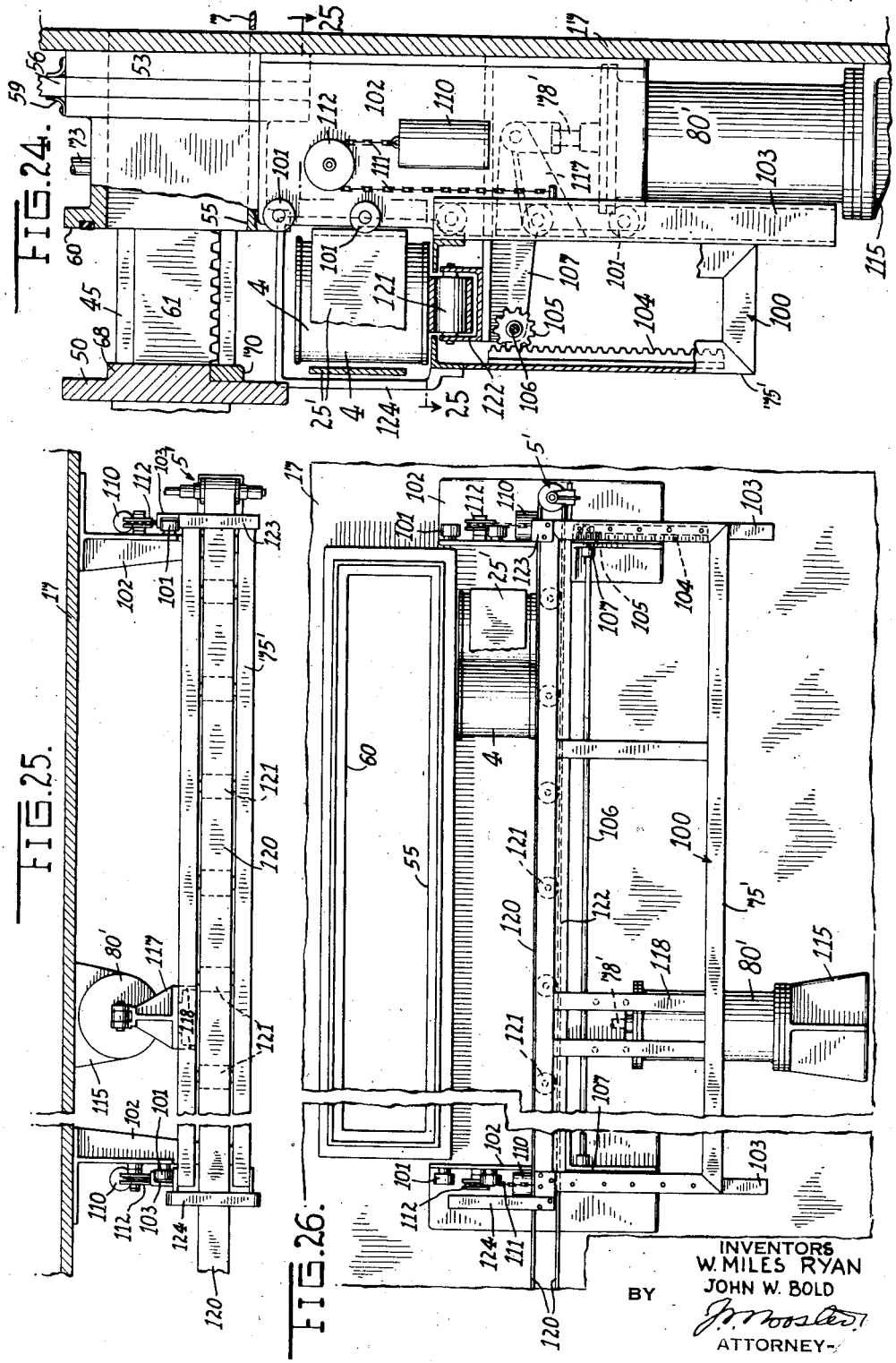

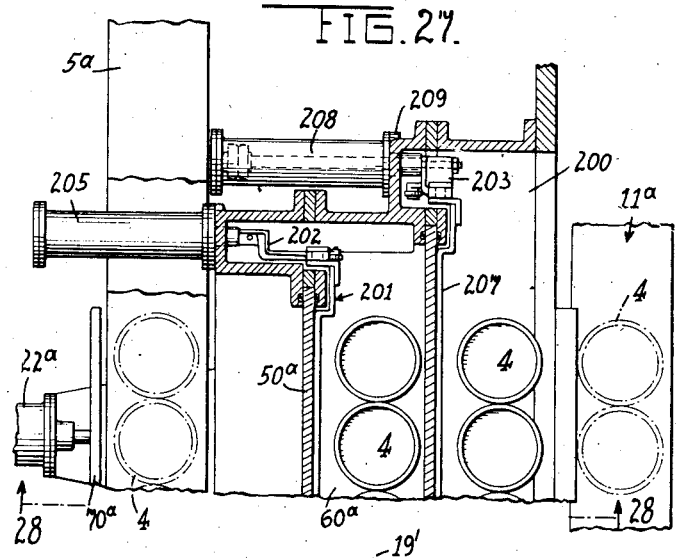
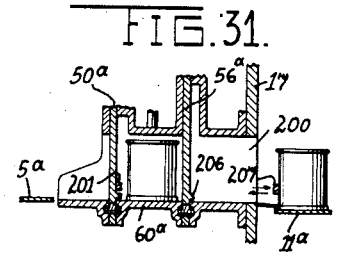
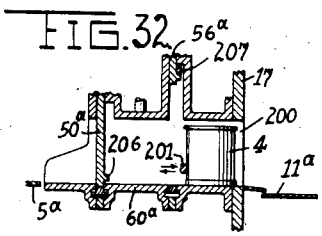
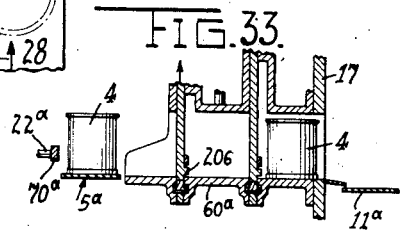
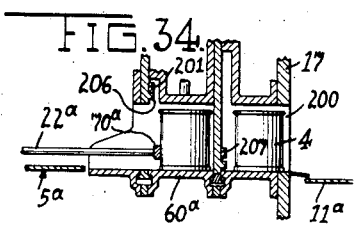
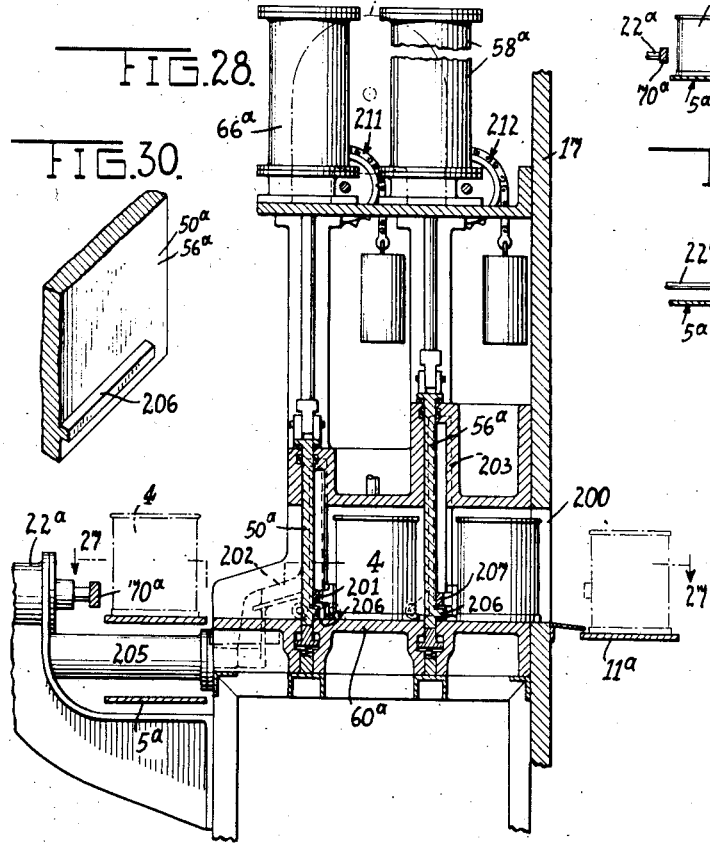
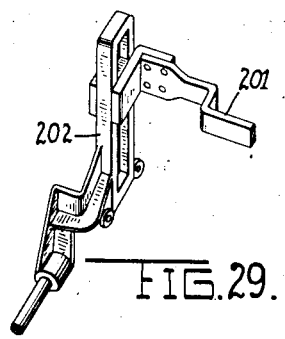

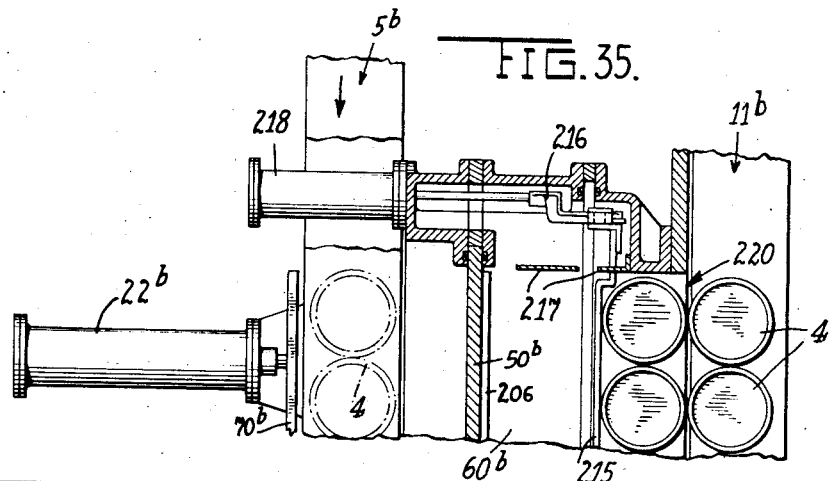
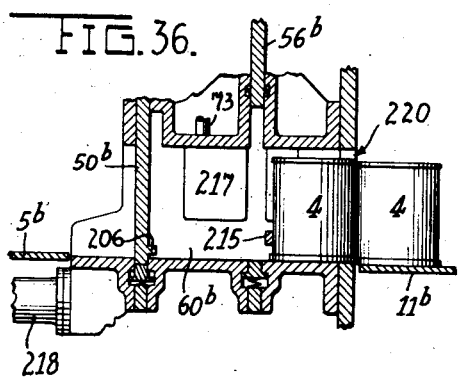
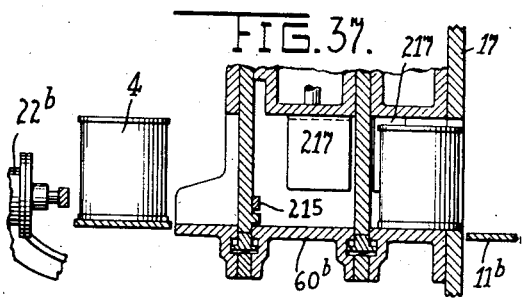
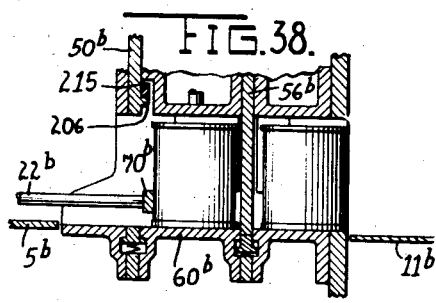
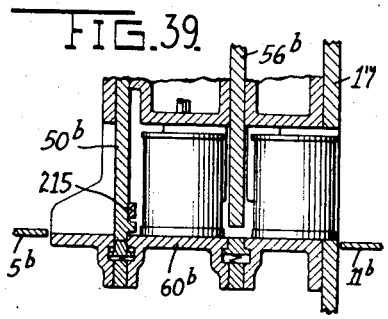
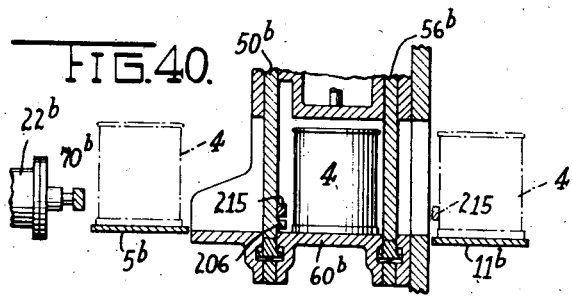

Patented Oct. 5, 1937

2,094,753

UNITED STATES PATENT OFFICE 2,094,753

APPARATUS FOR SEALING CONTAINERS UNDER VACUUM OR GAS

William Miles Ryan and John W. Bold, Brooklyn, N. Y., assignors to Ryan Coffee Corporation, New York, N. Y., a corporation of New York Application February 8, 1933, Serial No. 655,733

84 Claims. (Cl. 226—68)

This invention relates to sealing and packing machines for sealing and packing commercial commodities, either solids or liquids, such as coffee, meats, fats, vegetables, fruit and the like, in cans or jars or other containers, while they are located in an air-exhausted or air-free space.

The usual process of operation consists in automatically conveying the cans with their contents into a partially air-exhausted room, wherein they are fed to a capping or cover sealing or seaming machine, and then out of the sealing room onto a conveyor which in turn may carry the cans to any suitable destination; and during the process of entry and exit of the containers, undesirable and increased air pressure is always introduced into the sealing room.

It has consequently been found that in feeding containers into and out of the usual sealing room, considerable losses in air-exhaustion and therefore undesirable gains in pressure have been experienced and that therefore each container must now be subjected to an initial air-exhausting process before passing into the sealing room so as to prevent any air entering the same, and that similar precautions must be taken in passing the containers out of the sealing room.

It has also been found desirable to retain the contents of the containers in air-exhausted space over a certain length of time before sealing, without, however, sacrificing any of the time elements generally required in the process of conveying.

It is also of importance that the material in the containers should be subjected to the initial air-exhaustion process in a most gradual manner, so as not to unduly disturb this material, as otherwise a too sudden introduction to the rarefied air conditions of the sealing room causes the liquids to bubble over and the solids to blow out, without however, completing the air-exhausting process.

It is, therefore, one of the objects of our invention to provide mechanisms by means of which the containers will be fed into the air-free sealing room in a manner which will at first gradually remove the air from their contents before entering the sealing room.

A further object is to subject the contents of the containers to an air-exhausting process of comparatively long duration without, however, sacrificing any of the time which is ordinarily required to feed a container into and out of a sealing room.

Another object of our invention is to employ a method of conveying sealable containers to a sealing room which method consists in moving a group of containers in a direction requiring the shortest distance of travel for a complete displacement of the group.

A still further object of our invention is to provide valve chambers at the intake and output sides of the air-free sealing room to prevent changes of pressure within this room while the containers are being conveyed to and from the same and are being sealed within the room.

Another object is to have the containers, when passing through each valve chamber, stop therein for a certain length of time.

It is also an object of this invention to exhaust the air from intake and output valve chambers in controllable graduated stages while the containers are stationary.

A further object of this invention is to employ a new control device for the operation of the conveying mechanism as well as valves and the controls thereof, so as to simplify the operation of the complete mechanisms, increase production, and lower the costs thereof.

A still further object is to provide an air-tight sealing room from which not alone air may be exhausted, but which also may be filled with a gas other than air, suitable for contact with and the preservation of the contents of the containers.

Another object is to provide means, whereby the gas in the sealing room will not be subjected to a diminution in quantity through the operation of passing the cans into and out of the sealing room.

Another object is to provide mechanisms which are arranged in a manner to make all their elements as well as the conveyed containers easily accessible and readily removable, so as to permit instant relief if jams occur, thereby eliminating damages and further lowering the cost of operation.

A further object of this invention is to provide pressure-controlled and operated mechanisms which are simple in construction and operation, efficient as well as durable and which require comparatively little space in their installation.

Other and important objects will be pointed out in the following specification and particularly set forth in the subjoined claims.

A preferable construction of our invention is shown in the accompanying drawings of which:

Fig. 1 is a plan view of an air-controlled sealing machine or mechanism.

Fig. 2 is a sectional side view of same on line 2—2, Fig. 1.

Fig. 3 is a front view of the sealing machine, showing also the input or delivery mechanism with can conveyances.

Fig. 4 is a sectional side view of this delivery mechanism on line 3—3, Fig. 1.

Fig. 5 is a sectional plan view of a push bar, operated by a piston.

Fig. 6 is a sectional top view of the can lifting device on line 6—6, Fig. 4.

Fig. 7 is a plan view of the output or discharge mechanism with can conveyances.

Fig. 8 is a sectional side view of a gate-operated bar-lifting device on line 8—8, Fig. 7.

Fig. 9 is a sectional side view of a push-bar operatable by a piston on line 9—9, Fig. 7.

Fig. 10 is an enlarged plan view of the intake shown in Fig. 1.

Fig. 11 is a diagrammatic view of the system of air-operated conveyances and controls thereof as applied in connection with the sealing room.

Fig. 12 is a front view of a master control valve on line 12—12, Fig. 3.

Fig. 13 is a sectional side view of same on line 13—13, Fig. 12.

Fig. 14 is a sectional front view of the master control valve on line 14—14, Fig. 13.

Figs. 15, 16, 17, and 18 illustrate partial sectional side views of the can inlet or delivery mechanism of the sealing machine, depicting the various stages of moving a can or cans during part of a cycle of operation.

Figs. 19, 20, 21, 22, and 23 illustrate partial sectional side views of the can output or discharge mechanism of the sealing machine, depicting various stages of the removal of can or cans from the sealing room.

Fig. 24 shows a side elevation, partly in section, of an intake mechanism with a modified form of lifting device.

Figs. 25 and 26 are respectively plan and front views of same on a somewhat reduced scale.

Figs. 27 and 28 show respective sectional plan and side views of part of an intake mechanism with a cycle of operations different from that previously described, on respective lines 27—27, Fig. 28 and 28—28, Fig. 27.

Fig. 29 is a perspective view of a part of a push bar operating device.

Fig. 30 is a perspective view of part of the valve gates of this mechanism.

Figs. 31 to 34 illustrate partial side views of the intake mechanism of Figs. 27 and 28 depicting the cycle of operation during a delivery of a can from the conveyor towards the inside of the sealing room.

Fig. 35 is a partial sectional plan view of a modified form of the intake mechanism illustrated in Figs. 27 and 28.

Figs. 36 to 39 show partial sectional side views of the mechanism of Fig. 35 depicting various stages of displacement of the containers.

Fig. 40 is a partial sectional side view without the resting chamber shown in Figs. 36 to 39.

Figure 41:
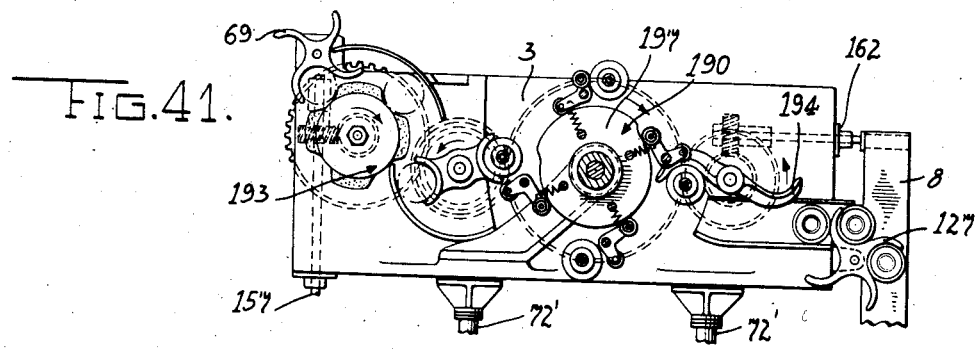

Fig. 41 is a plan view of a sealing machine.

Figure 42:
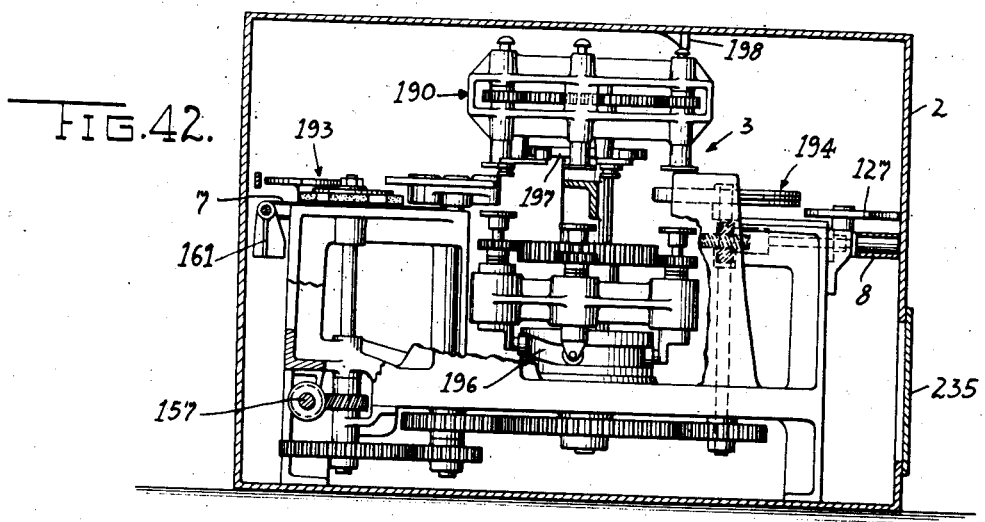

Fig. 42 is an end view of a sealing machine partly in section on line 42—42, Fig. 2.

Figure 43:
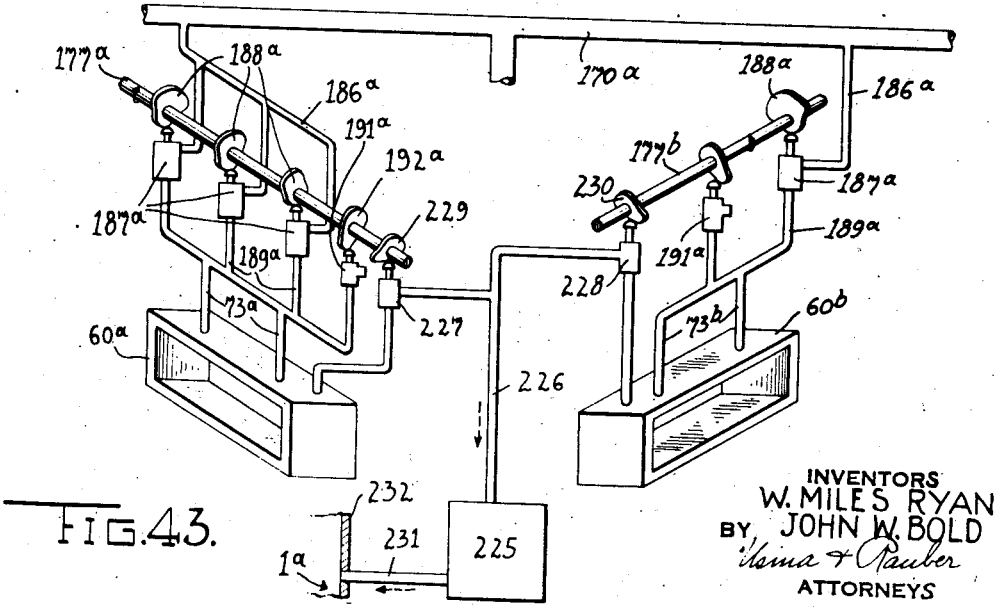

Fig. 43 is a partial diagrammatic view of that of Fig. 11. The modified mechanisms of Fig. 43 illustrate an arrangement for sealing containers under gas.

Throughout the specification and drawings similar reference characters denote corresponding parts.

Referring to Figs. 1 and 2, sealing room 1 with its enclosure or housing 2 has located therein a sealing machine 3. To this sealing machine are being fed sealable containers, such as cans 4, having therein foodstuffs or other commodities.

These cans are delivered on a belt or chain conveyor 5 to an intake or delivery mechanism 6 which is preferably mounted on a wall 17 of the housing 2. Cans 4 are delivered to the sealing room with their cover attached, loosely held in their proper place, so as to permit air to be extracted from the cans.

Intake mechanism 6 delivers the cans into the sealing room onto a conveyor 7 which in turn feeds the containers into the sealing machine 3, wherein their respective covers or caps are hermetically sealed so as to make the contents perfectly air-proof.

After the sealing process, the cans are delivered to conveyors 8 and 9 which place the same in front of wall 18 of room 1 opposite the wall 17. The cans are then transferred by a discharge mechanism 10 mounted on the wall 18, onto a belt or chain conveyor 11 outside the room which carries the cans away.

Sealing room 1 has mounted on its top a driving mechanism operated by a motor 15. This mechanism drives the sealing machine as well as control mechanisms and various conveyors as will be described more particularly hereinafter.

On the top of the sealing room is also mounted a motor 16, driving a mechanism, which exhausts or otherwise displaces the air in sealing room 1. Motor 16 also serves to operate means by which air may be exhausted from the operating valves, chambers and cylinders of the respective intake and output mechanisms 6 and 10, as will be described hereafter.

*Intake mechanism*

Referring to Figs. 1 to 23, and particularly to Figs. 1 to 6, the intake or delivery mechanism 6 comprises in the main a master control valve 19, an inlet valve 20 with mechanisms for opening and closing the same, a container lifting device 21 and a container transmitting or pushing mechanism 22, Fig. 5.

The details of construction of these four principal parts, and their related functions thereof, may be described as follows:

Cans 4 are delivered to the front, or intake side, of the machine by means of conveyor 5 which is driven by a motor 28, Fig. 3 through customary worm gearing 29 and mounted on a bracket 32 on wall 17. The cans are guarded on both sides by a rail 25 supported by brackets 27 on the wall 17 and bent to provide spaced lengths and an end 26 which will act as a stop for the containers. Each can before reaching the front part of the sealing room has to pass a turnstile 35, Fig. 10, rotatable on a bracket 36 which is mounted on the stationary cross-beam 37. The turnstile is operated by the moving cans on conveyor 5 and has a mechanism which automatically stops its rotation after a definite number of cans have passed. The number of cans shown by way of example to have passed the turnstile are twelve in the mechanism illustrated. It is understood, however, that this number may be varied to suit conditions.

To turnstile 35 is fastened a pinion 38 which turns a gear 39 having a stopwheel 41.

Its nose is engageable by a spring-operated lever 42 which like gear 39 is mounted on the bracket 36. The non-engageable end of the lever has a spring-operated pawl 43 actuated by an extension 44, Fig. 4, which is fastened to or forms a part of one of the slidable guide rails 45 of cover plate 50.

A movement of the rail 45 in a direction away from the sealing room will push the lever 42 out of engagement with the stop-wheel 41 thus releasing the turnstile to pass another group of cans towards the intake mechanism.

After the cans have been delivered in definite groups in the manner described they are automatically raised by a lifting device 21 which comprises a movable frame or carriage 75, guided in a carriage holder 76 fastened to the wall 17 by means of two or more brackets 77. This lifting device is operated by plunger 78 in cylinder 80 which is fastened to the lower frame work of carriage holder 76.

To the outer end of the plunger rod is fastened an operating plate 81 guided in four upright angle irons 82 forming a part of the carriage holder 76.

On the top surface of plate 81 are mounted two sets of chain-guiding rollers 83, each set engaging a chain 84 fastened at its ends to the outer and lower portions of the carriage 75 by means of bolts or pins 85, Fig. 3.

Each chain passes over two end rollers 86 and a central or pivotal roller 87. All six rollers are mounted on the top surface of the carriage holder 76 in any suitable manner as, for instance, brackets or pillow blocks. Operating plate 81 has two extensions 88 from which are suspended counteracting weights 89 to balance the weight of carriage 75.

When the piston 78 pulls the table 88 downwardly, the latter will lift the carriage 75 and the cans 4 to a position slightly above the level of the floor 55 of the valve chamber 60. This chamber which is large enough to encase the complete group of cans located on the lifting device is of rectangular formation and is secured to the wall 17 by means of bolts 52 passing through a frame 53 located between the chamber and the wall 17.

A rectangular valve gate 56 is slidably mounted between the frame 53 and the chamber 60. This gate is raised and lowered by means of a plunger 57 in cylinder 58 mounted in a recess in the wall 17 in any suitable manner, Fig. 4.

To prevent air from entering on both sides of the gate at the top of the chamber, especially while the gate is raised, flexible sealing flaps 59 are provided, preferably mounted on the top surfaces of plate 53 and chamber 60, and made of rubber, leather, asbestos, or other suitable material, reinforced with metal if desired. Since the flow of air will always be directed towards and not away from the gate and chamber, the flaps will, therefore, be pressed against the surfaces of the gate thus providing an effective seal against a potential flow of air. At the outer, longitudinally extended ends of the valve gate are two extensions 91, Fig. 3, to which are fastened chains 92 passing over two sprockets 93 and carrying weights 95 at their other ends.

Both sprockets are rigidly secured to a common shaft 94 which is rotatably journalled in bearings or brackets 96 secured to wall 17 of the sealing room.

The weights 95 serve to balance the gate 56 while the two interconnected sprockets prevent the gate from moving unevenly, thus eliminating binding at the extreme ends of the gate.

A stationary cross-beam 37 is supported a short distance in front of the chamber 60 by supporting bars 61 fastened to the end walls of the chamber. Guide-rails 45 secured to coverplate 50 slidably engage the upper and lower edges of the bars 61 and thereby guide and support the movement of the plate 50 to and from the chamber 60.

In order to provide uniform movement of the guide rails and thus preclude a binding effect between them and the bars 61, the latter are provided with teeth that mesh with gears 62 which are fast to a common shaft 63 journalled in bearings 64 on the coverplate 50. The latter is actuated by a plunger 65 in a cylinder 66 secured in any suitable manner to the front surface of crossbeam 37.

The back surface of coverplate 50 carries a protrusion 68 having the contour of the opening of valve chamber 60 and serving the purpose to displace as much space of the interior of the valve chamber as possible thereby gaining time required in reducing a corresponding volume of air from the chamber.

Below the protrusion 68 is located a push bar 70 secured to two plunger rods 71 which operate in cylinders 72 both of which are secured to and move with cover plate 50, Figs. 4 and 5.

The operation of the intake mechanism 6 is as follows:

The cans passing through turnstile 35 accumulate in a row above the lifting device 21 until a predetermined number of cans have reached their destination.

After this the row of cans is lifted by the fluid operated plunger 78 to a height permitting the cans to be pushed into the valve chamber 60 by means of push bar 70 operated by plungers 71, Figs. 15 to 18.

The cans enter chamber 60 in a group having a movement different from that of the group of cans passing onto the lifting device 21 or leaving the discharge conveyor 11. While the group-feed on the latter two devices may be referred to as an endwise directed feed, in that each group advances over the end of a line, the group-feed into and out of the valve chambers shall be referred to as a frontage formation, or frontwise-directed feed.

After the cans have entered valve chamber 60 the carriage 75 is caused to recede. Cover plate 50 is pushed against the front surface of valve chamber 60 and tightly seals the latter.

The unsealed cans will now be subjected to a process of air exhaustion through one or more air ducts 73.

This may be brought about in a most gradual manner by means of mechanism to be described later.

After a sufficient amount of air has been exhausted from the chamber and the air pressure therein reduced to that in the sealing room, the valve gate 56 is raised by the fluid operated plunger 57. This permits a spring-operated plunger bar 74 to rise to the level of the floor 55 and fill the gap left by the gate 56. A second operation of push bar 70 delivers the cans onto conveyor 7 which delivers them to the sealing machine through a conventional turnstile 69. The push bar 70 then returns to the coverplate 50 and the valve gate 56 closes the chamber 60. After this air is permitted to enter the chamber through airducts 73 whereupon coverplate 50 is returned to its initial position. In the meantime containers will again have accumulated above the lifting device so that the cycle of operation can at once be resumed.

Referring to Figs. 24, 25, and 26, the modified can lifting device as shown comprises a vertically movable carriage 100 which is guided by vertically spaced rollers 101 journalled on rectangular brackets 102 on the wall 17 of the sealing room near the ends of the carriage. The carriage engages the rollers 101 by means of channels 103 secured to the carriage and having the inner flanges that embrace the rollers 101.

The latter is preferably made of structural iron in the form of a frame. It has vertically mounted in its front corners a pair of toothed rods or racks 104 which engage gears 105 fastened to a shaft 106 rotatable in extensions 107 of brackets 102.

These racks and gears serve positively to guide the carriage horizontally, so as to keep the containers in level position and to prevent binding.

The carriage when not under load is balanced by counterweights 110 suspended from chains 111 trained over guide rollers or sprockets 112 and secured to the carriage.

The carriage is moved vertically by a plunger 78' in cylinder 80' which is secured to wall 17 by means of a bracket 115. The outer end of plunger 78' engages a connector or bracket 117 which is fastened to two angular uprights 118 forming a part of the carriage. The conveyor 5' delivering the cans towards the front of the sealing room may comprise a belt 120 supported by rollers 121 rotatably held in a channel or U-beam 122 or other suitable bearing support on extensions 107 of the bracket 102. The conveyor may be driven by an electric motor and gear reduction in the manner illustrated in Fig. 3. To prevent the frame 75' of carriage 100 from spreading at the top, a bracing strip 123 is provided at the dead-end side, and across the top surfaces of the carriage; while at the live-end side a frame or yoke 124 connects the open carriage and braces the same and also permits the cans to pass through the same.

The cans are guided in a rail 25' similar to that shown in Fig. 4.

The operation of the lifting device in connection with the moving parts of the valve chamber mechanisms is identical with that previously described.

*Discharge mechanisms*

The containers or cans coming from the sealing machine in the room 1 are delivered by means of conveyors 8 and 9 and turnstiles 127, 128 to a discharge mechanism 10 in the wall 18 and are grouped in a line in front of a gate 56' which closes the room 1 from a transfer chamber 60' of the discharge mechanism 10. Valve gate 56' is balanced by weights 95' on shaft 94' in the usual manner. After a group of cans have thus been assembled on conveyor 9 and held by a stop plate 126 the gate 56' is lifted and the cans are transmitted to and through the chamber 60'. The cycle of operation for the discharge of the cans from the sealing room is as follows referring to Figs. 19 to 23:—

After the gate 56' has been raised by a plunger in a cylinder 58', the cans are pushed into the valve chamber 60' from the conveyor by means of a push bar 70' operated by plungers in cylinders 72' which are preferably mounted in the housing or other suitable part of sealing machine 3. Pushbar 70' when in normal location, that is, with its plungers retracted, also serves as a guide for the cans. After the pushbar has been withdrawn from the valve chamber, valve gate 56' is lowered depressing a plunger bar 74' and closing the chamber. Air is permitted to enter the chamber through airducts 73' being excluded from the room 1 by the lowered gate 56'. A closure plate 50' forming the outer wall of the chamber is then withdrawn by means of a plunger 65' in cylinder 66' on a stationary crossbeam 37' which in turn is mounted on brackets 61' on outer ends of the chamber 60'. Coverplate 50' is slidably held on these brackets in a similar manner as that shown on the previously described input mechanism 6, also having a rack and gear mechanism with a shaft 63' to prevent binding.

In order to receive the cans from within the valve chamber, see Fig. 21, a carriage 75' is provided and mechanisms to lower and raise the same, identical in construction as those shown, Figs. 3 and 4.

After carriage 75' has been raised to a height level with the floor of the chamber 60', the cans are placed onto the carriage by means of a transfer device 125 comprising two plungers with rods 129 movable in cylinders 130. The latter are mounted at the outer ends of the front wall of chamber 60' on brackets 61' in any suitable manner. To plunger rods 129 are fastened oblong shaped rod carriers 136, Fig. 9, with which is movable in a vertical direction, a transfer rod 135. This rod which is shown to have a rectangular cross section is ordinarily located within a groove, extending the length of the floor 55' of the valve chamber.

Beyond the outer ends of this groove, the floor 55' is sunk in, the approximate height of the rod, to give space for the rod carriers to move back and forth.

Transfer rod 135 is lifted out of the groove by means of two levers 137 pivoted in the wall of the valve chamber at both ends of the valve gate 56'. One arm of each lever underlies the lower surface of transfer rod 135, Fig. 8, while the other arm is actuated by a nose 138 on the lower part of the valve gate. When the latter has reached its lowest position, the transfer rod 135 will have been raised out of the groove as shown in dotted lines of Fig. 8, as well as Figs. 20 and 21.

After the rod has thus been released and the coverplate 50' as well as carriage 75' has been placed in the positions shown in Fig. 21, plunger rods 129 are caused to move cans 4 from the chamber to the carriage by means of rod 135. Here the cans will be lowered by the carriage mechanism and automatically placed onto the conveyor 11. After this, the cover plate 50' will return to close the chamber. After an exhaustion of air from the valve chamber, valve gate 56' may again be raised for the reception of a new group of containers. This will permit transfer rod 135 to sink into its groove.

Transfer rod 135 is bent backward near its end 139 as shown in Fig. 7 so as to permit the active part of the rod to push the cans sufficiently far out of the chamber.

In the description of the lowering device 21' of the discharge mechanism, the same carriage operating device as that shown in Figs. 3 and 4 is illustrated. It is understood however that the mechanism shown in Figs. 24, 25, and 26 may also be used, if so desired.

*General operating mechanisms*

The sealing or capping machine 3 is driven in synchronism with the timing or operation of the inlet and discharge mechanisms and associated conveyor mechanisms so that the containers will be introduced into the sealing room, conveyed to the capping machine and removed therefrom at the exact time intervals required for the smooth operation of the latter. For this purpose these various mechanisms are driven and controlled by the motor 15 through a speed reduction unit 150, Figs. 1 and 2, which has two power take-off shafts. One of these shafts connects with gear and chain transmissions 151, 152, which in turn drive the control valves 19 and 19' mounted on supports 153 on their respective valve chambers 60 and 60'.

The other power take-off shaft of the reduction unit 150 drives a vertically disposed transmission shaft 155 passing through a stuffing box 156 into the sealing room and connecting through suitable gearing with the drive shaft 157 of sealing machine 3 for the operation of same.

The drive shaft 157 through a chain drive 158 also rotates a conveyor transmission shaft 160 journalled on brackets 161 on the walls 17 and 18 of the sealing room. Shaft 160 drives the aprons of conveyors 7 and 9 in like directions of travel. A shaft 162 at the outlet end of the sealing machine 3 drives the conveyor 8.

Conveyor 11, operating with the discharge mechanism 10 is driven by a motor not shown on the drawings, Figs. 1 and 2.

The air operating devices of the various mechanisms comprise a motor drive 16 for the operation of two high vacuum pumps 165, 166 and provided with conventional means of collecting dust, etc. Pump 165 withdraws air from sealing-room 1 through a suction pipe 167 having a standard main valve 168. Discharge pipe 169 of pump 165 leading into freed space may have any suitable length desired. Pump 166 is used for the withdrawal of air from the vacuum chambers 60 and 60' and the operation as well as control of the various cylinders forming part of the respective intake and discharge mechanisms 6 and 10 as illustrated diagrammatically in Fig. 11.

Main suction pipe 170 connects pump 166 with control valves 19 and 19' Figs. 11-14 both of which are identical in their structural features. In referring to valve 19, housing 171 with its respective rear and front plates 172, 173 has a vacuum chamber 174 within which is rotatable a control disc 175 mounted on shaft 177 driven by transmission 151, Fig. 1.

Control disc 175 is held pressed against the inner surface of front plate 173 by means of a spiral spring 179 centrally located on shaft 177. The upper half of plate 173 is provided with two rows of holes each arranged on arcs. Holes 181 of the row of the smaller arc, connect direct with the atmosphere, while those of the larger arc and radially arranged with the other are provided with pipes 182 which connect with the various cylinders of the machine.

Control disc 175 is provided with a valve connecting hole 180, permitting the air to be withdrawn from either end of the cylinders while slowly passing over the openings of the cylinder-connecting pipes 182. Control disc 175 is also provided with two air pockets 185, formed to give a free passage of air through one or more holes 181 and one or more of the air-exhausted pipes 182, thus permitting the air to enter into those cylinders which had previously done their work during a cycle, and making the same ready for their next operation.

The arrangement of pipe connections between control valve 19 and the cylinders 58, 66, 72 and 80 is such that the operation of the rotating control disc coincides with the sequence of the operation of the cylinders and the respective stages of displacements of the cans. It will be noted that the first of the various pipes 182,—as read in clockwise direction,—connects with cylinder 58. This will raise valve gate 56, Fig. 17, as soon as hole 180 passes over the opening of this first pipe. The second pipe connection is for the operation of cylinders 72 to push the cans onto the conveyor and so forth until the cycle of operation has been completed and the plunger of cylinder 66 presses cover plate 50 against valve chamber 60, Fig. 17.

During the next one-half of the revolution of control disc 175, no cylinders are operated, leaving pump 166 free to exhaust air from valve chamber 60. This is done in the following manner:

Pipe line 170 connects with a pipe 186 having several branches three being shown by way of example, each leading to a vacuum pressure regulator 187 operated by respective cams 188 rotated by the shaft 177 of the control valve. Each regulator is connected with a pipe 189 which leads to air ducts 73 of valve chamber 60. Each regulator is set for a different pressure and the timing for operation is such that the regulator for high air-pressure and therefore low vacuum will be operated on first by a respectively active cam, the regulator for medium pressure will be acted upon second and the other regulator third. Each cam 188 is designed to retain its respective pressure regulator in an operated position until the last cam has acted on its respective regulator as shown by means of the cam surfaces, the lengths of which overlap each other. The result is that the air is withdrawn from the valve chamber progressively so that the contents in the cans will be subjected to a gradual uninterrupted withdrawal of air during approximately one-half of a revolution of control disc 175. This gradual and constant withdrawal will not disturb the contents in the cans and permit the creation of a higher vacuum in the chamber within a comparatively short period. After the air has been exhausted, a connection is established with the sealing room, by means of valve gate 56 which is to be raised, as depicted in Fig. 17. After the cans have reached the sealing room and the chamber is closed again, air is admitted into the chamber in order to release the pressure on cover plate 50 before moving the same. A release valve 191 is provided for this purpose. It is connected to the chamber through piping 189, 73 and is acted upon by a cam 192 on shaft 177 at a moment shortly after valve gate 56 has been lowered.

The cycle of operation of the discharge mechanism 10 is practically identical with that of the intake mechanism. Control valve 19' permits the operation of the various cylinders connected with pipe lines 182' in the manner previously described. Shaft 177' of the control valve rotates cams 188', 192' for the operation of a respective pressure regulator 187' and release valve 191' for the purpose described above.

The movements of the containers passing toward, through, and from the sealing room vary in regard to the group formations and directions of feed. After an endwise directed movement of containers on conveyor 5, the group formed thereon is transmitted into chamber 60 in a frontage formation. After the air has been exhausted and gate 56 has been raised, a second frontage formation feed takes place. When the group has reached conveyor 7 it is subjected to an endwise directed feed toward the sealing machine. After leaving the sealing machine this group is again subjected to an endwise directed feed on conveyor 9. Thereafter the group receives two movements which are frontwise directed when passing through chamber 60' and when reaching conveyor 11 will again travel in an endwise directed feed. Each group will thus be subjected to successive changes in direction, which will take place after every second group movement into, within and out of said sealing room.

In order to permit an attendant of the machine a certain control over the operation of the closing and opening elements of the chambers 60 and 60', an independent motion valve 190 is provided, which, when opened, joins the main pipe line 170 with two independent sets of pipes 195 and 195', permitting the air to be withdrawn from respective cylinders 58, 58' and 66, 66' with which the independent pipes are connected. This will raise the respective valve gates and remove the respective cover plates from the chambers, so as to make the latter accessible and permit the operator to clean the same or remove cans therefrom if, for some reason or other, the sealing machine has to be stopped. The independent valve 190 will also act as a safety valve in that it can instantly stop all movements of the intake and discharge mechanisms, while at the same time keeping open the access through the valve chamber towards the sealing room. This is made possible by having valve 190 close the connection with pipe 170 and at the same time open that of pipes 195 and 195' for the operation of the various valve chamber closures. If the valve chambers are thus being opened independently, in the manner described, it is of course understood that the operator may also operate main valve 168 of Fig. 1 to stop the air to be withdrawn from the sealing room. Door 235 in one of the walls of the sealing room permits the operator to enter the latter.

The sealing machine as shown in Figs. 41, 42 comprises in the main conventional rotary inlet conveyors 193 operating toward the sealing head 190 and a rotary discharge conveyor 194 for a delivery of containers from the sealing head to conveyor 8. Sealing head 190 is operatable during its rotation by stationary cams 196, 197, and 198, the latter of which may be fastened to the inner surface of the wall of sealing room 1. A further and detailed description of this machine is not deemed necessary in that it does not form a part of this invention. Sealers of this or similar types are sufficiently known and purchasable on the market. Any type thereof may be employed, if so desired.

While the contents in jars, cans and other containers are mostly subjected to a vacuumizing process before sealing, it is in some cases desirable to seal these contents in a selected gas or gases.

In order to do this the sealing room is filled with a gas, by means of pump 165 or other suitable contrivance. Exhaust pump 165 could be converted into a pressure pump, so that the gas drawn from the inlet pipe 169 will be transmitted through pipe 167 into the room under pressure. This room is also provided with a mechanism which will prevent a loss of gas while the containers are moved into and out of the sealing room.

Fig. 43 illustrates respective inlet and outlet valve chambers 60a and 60b, each being connected with respective pipes 73a, 73b which are connected with piping 189a leading to various pressure regulators 187a, as well as release valves 191a. These regulators and valves are operated by cams 188a on shafts 177a, 177b connected to two rotary control valves (not shown) and operated in the manner previously described. The pressure regulators of both chambers are each connected by pipes 186a, which lead to the main pipe 170a.

The new feature of the arrangement shown in Fig. 43 is a mechanism which comprises a suction pump 225, connected by means of pipes 226 with suitable valves 227, 228 operated by respective cams 229, 230, which are driven by related shafts 177a, 177b of the referred to rotary control valves.

The outlet pipe 231 of the pump is connected to any suitable wall portion 232 of sealing room 1a.

The operation of the sealing apparatus in connection with a gas filled sealing room can be described as follows:

After the air has been exhausted from the valve chamber 60a by means of suction pump 225, valve gate 56 will be raised, see Fig. 17, permitting the gas in the sealing room to enter the chamber and contact with the contents of the cans. After the cans have been transmitted from the chamber onto the conveyor in the sealing room and the inner gate has again been lowered, cam 229 will have opened valve 227, permitting suction pump 225 to transfer the gas in the valve chamber back into the sealing room. After the gas has left the valve chamber and cam 229 has left its valve, cam 192a will open valve 191a to permit air to enter the chamber and facilitate the removal of cover plate 50, Fig. 15, through the elimination of air pressure on the same.

When removing the sealed cans from the sealing room the operation of transferring the gas from valve chamber 60' to its original source, is similar to that already described. After the cans have entered the valve chamber 60' and valve gate 56' has closed the latter; Fig. 20, cam 230 will open valve 228. The gas in the chamber will be withdrawn and forced into the sealing room. After this, valve 191a will be operated to permit air to enter the chamber and the cycle of operation will be continued in the manner formerly described.

*Modified intake and discharge mechanisms*

The mechanisms shown in Figs. 27 to 40 illustrate modified forms of construction of intake arrangements having a cycle of operation different from the one previously described.

Referring to Figs. 27 to 34 containers 4 on conveyor 5a are placed by the latter in front of a valve chamber 60a. After valve gate 50a has been raised by means of a cylinder 66a, the cans are pushed into the valve chamber by a cylinder-operated transmitter or push device 22a. Valve gate 50a is lowered again to permit air to be exhausted from the chamber. Valve gate 56a will then be raised by means of cylinder 58a, Figs. 28, 32, to permit the containers to be transferred onto a platform of an ante-chamber or resting place 200 of the sealing room. The containers are moved into the ante-chamber by means of a transmitter bar 201, Fig. 29, vertically slideable on its ends in bar holders 202 in form of brackets fastened to the plunger rods of cylinders 205. The reason for making the bar vertically slideable in its holders is to keep the bar out of the way, while a new group of cans is pushed into chamber 60a. This is accomplished by having bar 201 rest on a cleat 206 of the lower inner section of gate 50a, when the latter is in a raised position.

Push bar 207 which may also be referred to as a transmitter and which moves the containers from the ante-chamber 200 onto the conveyor 11a of the sealing room, is operated by means of cylinders 208 located at the farthest ends of valve chamber 60a and fastened to auxiliary walls 209. Bar 207 in holders 203 is also raised by a cleat on valve gate 56a in order to clear the way for the containers coming from valve chamber 60a, Fig. 32.

Both gates 50a and 56a may be provided with respective counterbalancing mechanisms 211, 212.

The various stages of operation as shown in Figs. 31 to 34 subject the contents of the cans to a longer process of air exhaustion than those depicted in the previously described mechanism, on account of the provision of an ante-chamber or resting place in the sealing room.

The mechanism of Figs. 27, 28 does not require a lifting and lowering device but otherwise retains all the principal features of the previously described mechanisms.

The difference of the mechanism of Fig. 35 over that of Figs. 27, 28 is, that in the latter the push bar 207 with its operating cylinders 208 is left out and that the front row of cans when moved from the ante-chamber onto the conveyor are not pushed by a bar, but by the row of cans directly behind the front row, as shown in Figs. 35, 36.

The cans in the rear have been moved into the ante-chamber or resting place 220 by means of a push bar 215 slideably held in bar holders 216 similar to holder 202, Fig. 29. Holders 216 are moved back and forth by means of cylinders 218 fastened to the front walls on the sides of valve chamber 60b. The latter is provided with valve gates 50b and 56b operated in a manner alike to that previously described. The containers are moved from conveyor 5b into valve chamber, Fig. 38, by means of a pusher device 22b identical in construction with that shown on Figs. 27, 28. After the pusher has been withdrawn and valve gate 50b lowered, the air is withdrawn and valve gate 56b is raised, Fig. 39. Shortly after this, push bar 215 is set into operation moving the cans into the valve chamber and at the same time pushing the cans of ante-chamber or resting place 220 onto conveyor 11b of the sealing room as shown in Fig. 36. In order to prevent those cans, located on each end of a row, from moving out sideways, side walls 217 are provided, which are preferably held to the inner top surface of the valve gate chamber.

The modification of Fig. 40 over the construction shown in Fig. 35 consists in showing the former without the ante-chamber 220 of the sealing room. The containers moved from the valve chamber may therefore be transferred directly to the conveyor 11b, if so desired.

While the modifications shown in Figs. 27 to 40 are shown and have been described as intake mechanisms, it is quite evident that they may also be employed as discharge mechanisms requiring but a few alterations, similar to those made with the discharge mechanism 10 of Fig. 7.

From the foregoing description of our invention, including the various modifications thereof, there will be obvious numerous advantageous and novel features.

Some of the main characteristics thereof are the displacement of containers from a conveyor to a sealing machine with a considerable gain in time for the vacuumizing of the contents in the cans. This gain is obtained by means of moving the containers in groups into a prevacuum chamber in which the air is taken from the whole group of containers at one time. Another gain in time is derived through subjecting each group of cans to a movement which will not be longer than that required for the displacement of one can the length of its own diameter. A further gain in time is derived through the provision of an ante-chamber or resting place.

Another characteristic of our invention is the provision of applying the air exhaust to the containers in a gradual manner and to also subject this exhaust to the cans during a comparatively long period, which may be made to vary by changing the speed of the control valve.

Another novel and advantageous feature of our invention is that we provide means through which the contents of the sealable container are not alone subjected to a vacuumizing process in the manner described, but that they may be contacted with a certain desirable gas or gases right after vacuumizing, in such a manner that after the gas-charged cans have been sealed, comparatively no outside losses of gases will have been sustained, during the process of conveying the cans into and out of the sealing room and its respective mechanisms.

While these and various other novel features described are obtained by means of certain definite arrangements of mechanisms as well as methods of operation, we wish to have it understood that the same may be greatly modified if so desired, without however departing from the spirit of our invention.

It might be desirable for instance to have the various cylinders operated by air pressure instead of suction. This may easily be done by connecting pipes 186, 186' of Figs. 1 and 11, to an air exhaust independently operated by motor 16 and changing pipe 167 of pump 165 from the exhaust to the pressure side thereof.

It is further understood that the various mechanisms on the outside of the sealing machine may be located differently and that for instance the motors and pump may be stationed on the floor and either one of the intake or output mechanisms be mounted to walls which are at right angles instead of parallel to each other.

It is also understood that a reference to the various transmitting devices as conveyances or conveyors is to be interpreted in the broadest meaning of the term.

The sealing room as shown in Figs. 1 and 2 may of course be formed in such a manner as to reduce the space within to a minimum, thereby saving power in exhausting air therefrom, or it may, if so desired be furnished with two or more sealing machines, with a provision of two or more inlet and output valve chambers and conveyances to suit the conditions.

In referring to a space as being air-free in some of the following claims it is understood that this term implies the meaning that the sealing room may either be air-exhausted or filled with a gas other than air.

Having described our invention, what we consider to be new and desire to secure by Letters Patent is:

1. Apparatus of the type described comprising means for advancing containers in sequence to a grouped position, a room, a chamber between said room and said grouping position, means to progressively modify the gas within said chamber from atmospheric condition to the condition within said room, and means to transfer said grouped containers between said chamber and said room without substantial change in gaseous content.

2. Apparatus for transferring and subjecting containers to vacuum comprising a room, means to bring a series of containers in sequence into an aligned group, means to advance said containers as a group in a direction at an angle to the line of alignment, means to progressively withdraw gas from said group of containers, and means to move said containers into said room after said withdrawal of gas.

3. Apparatus for transferring and subjecting containers to vacuum comprising a room, means to bring a series of containers in sequence into an aligned group, means to advance said containers as a group in a direction at an angle to the line of alignment, means to progressively withdraw gas from said group of containers, means to move said containers into said room after said withdrawal of gas, and means for advancing said containers in individual sequence after entering said room.

4. Apparatus for removing containers from a vacuum room which comprises means for collecting said containers in a group within the room, a transfer chamber, means for transferring said containers in a group to said transfer chamber, means to close said transfer chamber from said room, and means to transfer containers as a group from said chamber.

5. Apparatus for feeding containers to a sealing room which comprises means for moving containers in file to a collecting space, means to move a group of said containers sidewise from said collecting space to said sealing room, and means to interrupt said sidewise movement and progressively withdraw gases therefrom before entering said sealing room.

6. A method of feeding filled containers under a change in gaseous pressure which comprises assembling said filled containers upright in a group, subjecting said containers in said group simultaneously to a progressive alteration of gaseous pressure, and moving said group of containers into an atmosphere similar to the altered gas content of said group.

7. A method of feeding filled containers under a change in gaseous pressure which comprises assembling said filled containers upright into a group, subjecting said containers in said group simultaneously to an uninterrupted alteration of gaseous pressure, moving said group of containers into an atmosphere similar to the altered gas content of said group, and moving said containers individually out of said group within said atmosphere.

8. A method of feeding filled containers under a change in gaseous pressures which comprises assembling a group of filled containers upright in a straight line, progressively reducing pressure on said group, and introducing said group into an atmosphere of similar reduced pressure in a direction at an angle to the alignment of said containers.

9. A method of feeding filled containers under a change in gaseous pressures which comprises assembling a group of filled containers in a straight line, progressively reducing pressure on said group, introducing said group into an atmosphere of similar reduced pressure in a direction at an angle to the alignment of said containers, and distributing said containers separately from said alignment within said atmosphere.

10. A method of feeding filled containers under a change in gaseous pressures which comprises moving individual containers in file, bringing them to rest in an aligned group, moving said aligned filled containers as a group at an angle toward an inclosure, constantly modifying the gas within said filled containers to substantially that of said inclosure, and then introducing said containers into said inclosure.

11. A method of feeding filled containers under a change in gaseous pressures which comprises moving containers in file to form a group of aligned containers, then moving said filled containers as a group at an angle into an inclosure of different gaseous condition from that in said containers, and constantly modifying the gaseous condition in said filled containers in group formation to that within said inclosure before their introduction into the latter.

12. A method of supplying filled containers for packaging in an inclosure of different gaseous condition which comprises moving said containers in sequence into a group position, moving said containers as a group into said inclosure, progressively changing the gaseous condition within said filled containers after assembly in a group and prior to their entrance into said inclosure to substantially the condition in said inclosure, and moving said containers in sequence from their group position after entrance into said inclosure.

13. A method of introducing filled containers into an inclosure under reduced pressure for sealing therein which comprises assembling said containers in a group, enclosing said group, progressively reducing the gas pressure of filled containers in said enclosed group to the pressure in said inclosure, and introducing said group while under reduced pressure, into said inclosure.

14. A method of introducing filled containers into an inclosure under reduced pressure which comprises supplying said containers in a file to an aligned group, moving said group at an angle to their previous movement from their position of alignment, enclosing said filled containers in said group, progressively reducing the gas pressure on said enclosed group, moving said filled containers as a group under said reduced pressure into said inclosure, and thereafter moving said containers from said groups in sequence.

15. A method of supplying filled containers to a sealing room having a selected gas which comprises, enclosing said containers, gradually withdrawing air from said enclosed containers to avoid disturbance of the material therein, admitting selected gas to said enclosed containers, and admitting said containers to said room.

16. A method of supplying filled containers to a sealing room having a selected gas which comprises, enclosing said containers in groups, gradually withdrawing air from said enclosed containers to avoid disturbance of the material therein, admitting selected gas to said enclosed containers, and admitting said containers to said room.

17. A method of supplying and withdrawing containers to and from a room having a selected gas which comprises, enclosing said containers, withdrawing air from said enclosed containers, admitting selected gas to said enclosed containers, admitting said containers to said room for treatment therein, enclosing and isolating said containers from said room, withdrawing enclosed gas from about said containers, and discharging said containers to the atmosphere.

18. A method of supplying and withdrawing containers to and from a room having a selected gas which comprises, enclosing said containers in groups, withdrawing air from said enclosed containers, admitting selected gas to said enclosed containers, admitting said containers to said sealing room, sealing said containers therein, enclosing and isolating said containers from said room, withdrawing enclosed gas from about said containers, and discharging said containers to the atmosphere.

19. A method of withdrawing containers from a room having a selected gas content which comprises, enclosing and isolating said containers from said room, withdrawing the enclosed gas from about said containers, and discharging said containers to the atmosphere.

20. Apparatus for supplying and withdrawing containers to and from a room having a selected gas which comprises, means for enclosing said containers, means for withdrawing air from said enclosed containers, means for admitting selected gas to said enclosed containers, means for admitting said containers to said room for treatment therein, means for enclosing and isolating said containers from said room, means for withdrawing enclosed gas from about said containers, and means for discharging said containers to the atmosphere.

21. Apparatus for supplying and withdrawing containers to and from a sealing room having a selected gas which comprises, means for enclosing said containers in groups, means for withdrawing air from said enclosed containers, means for admitting selected gas to said enclosed containers, means for admitting said containers to said sealing room, sealing means in said room, means for enclosing and isolating said containers from said room, means for withdrawing enclosed gas from about said containers, and means for discharging said containers to the atmosphere.

22. Apparatus for withdrawing containers from a room having a selected gas content which comprises, means for enclosing and means for isolating said containers from said room, means for withdrawing the enclosed gas from about said containers, and means for discharging said containers to the atmosphere.

23. Apparatus for supplying containers to a room which comprises a chamber, pneumatic means to open and close said chamber to atmosphere, pneumatic means to open and close said chamber to said room, and pneumatic means to transfer containers into and from said chamber in timed relation to the opening and closing of said chamber to atmosphere and to said room.

24. Apparatus for supplying containers to a room which comprises a chamber, pneumatic means to open and close said chamber to atmosphere, pneumatic means to open and close said chamber to said room, pneumatic means to transfer containers into and from said chamber in timed relation to the opening and closing of said chamber to atmosphere and to said room, and means to time the opening and closing of said chamber alternately to said room and to atmosphere.

25. Apparatus for sealing containers under air free conditions, comprising a sealing room, means to regulate the pressure of the space filling medium in said room, a sealing machine therein, a valve chamber, means to transmit containers through said valve chamber to said sealing machine for sealing purposes, means to interrupt the movement of the containers while in said chamber and further means to vary the gaseous pressure on said containers at a rate free from abrupt change.

26. Apparatus for sealing containers under air free conditions, comprising a sealing room, means to regulate the pressure of the space filling medium in said room, a sealing machine therein, a valve chamber, means to transmit containers through said valve chamber to said sealing machine for sealing purposes, means to interrupt the movement of the containers while in said chamber and further means to vary the gaseous pressure in said chamber at a rate free from abrupt change.

27. In mechanisms of the character described, a sealing room, sealing appliances for containers within said room, inlet and outlet chambers, means to open and close said chambers to said room and to atmosphere, conveyors to transmit containers to and from said respective chambers, fluid operated mechanisms to transmit the containers from the inlet chamber into the sealing room and from the sealing room to the outlet chamber, and timing means to control the supply and exhaust of fluid to said mechanisms in sequence.

28. In mechanisms of the character described, a sealing room, means to exhaust air therefrom, sealing appliances for containers within said room, fluid operated mechanisms to transmit containers into and out of the sealing room, and means to control the supply of fluid to said mechanism in timed sequence.

29. In mechanisms of the character described, a sealing room, means to exhaust air therefrom, sealing appliances for containers within said room, conveyances to transmit containers to said sealing appliances, fluid operated means to transmit the containers in to the sealing room in groups and means to exhaust air from said groups of containers while being transmitted to said room.

30. In mechanisms of the character described, a sealing room, means to exhaust air therefrom, sealing appliances for containers within said room, and fluid operated mechanisms to transmit containers into and out of the sealing room in groups forming a straight row.

31. In mechanisms of the character described, a sealing room, means to exhaust air therefrom, sealing appliances for containers within said room, and fluid operated mechanisms alternatively open to said room and to the atmosphere to transmit containers into and out of the sealing room while maintaining pressure, means to withdraw air from said transmitting mechanisms when closed, and timing means to control the operation of said transmitting mechanisms and said air withdrawal means in timed sequence.

32. In mechanisms of the character described, a pressure controllable sealing room with sealing appliances therein, conveying mechanisms for the delivery of containers to said sealing room and comprising means for lifting groups of containers in a row upwardly toward said sealing room.

33. In mechanisms of the character described, a pressure controllable sealing room with sealing appliances therein, valve chambers, conveying mechanisms for the delivery of containers through one of said chambers to said room and the discharge from said room through the other chamber; said conveying mechanism comprising vertically operated carrying devices to deliver containers in groups in a row at an angle to the length of said row, and close said chambers alternatively to said room and to the atmosphere and to extract air from said chamber while it is filled with containers and closed.

34. In mechanisms of the character described, a pressure controllable sealing room with sealing appliances therein, conveying mechanisms for the delivery and discharge of containers to and from the sealing room and its appliances, said conveying mechanisms comprising fluid operated transmitting devices and means to control the operation of said devices in cycles for balanced delivery and discharge of the containers.

35. In mechanisms of the character described, a pressure controllable sealing room with sealing appliances therein, valve chambers forming a part with the housing of the sealing room, fluid operated valve gates to open and close said chambers to atmosphere and to said room, means to withdraw air from said chambers, conveying mechanisms for the delivery and discharge of containers to and from the sealing room and its appliances, said conveying mechanisms comprising fluid operated transmitting devices and means to control the alternate operation of the valve gates, the transmitting devices and the withdrawal of air in cyclic sequence to deliver and discharge the containers to and from the room.

36. In mechanisms of the character described, a sealing room, valve chambers delivering to and from the sealing room, fluid operated valves to open and close said chambers alternatively to said room and to atmosphere, means to extract air from said chambers, fluid operated conveying mechanisms for the delivery and discharge of containers through said chambers to and from the sealing room and means to control the operation of the valves, the transmitting devices and the extraction of air in sequence independently for delivery and discharge of containers to and from the room.

37. In mechanisms of the character described, a sealing room having sealing appliances therein, valve chambers delivering to and from the sealing room, fluid operated valve gates to open and close said chambers alternatively to said room and to atmosphere, means to exhaust the gaseous content of said chambers, conveying mechanisms for the delivery and discharge of containers to and from the sealing room and its appliances, said conveying mechanisms comprising fluid operated transmitting devices to convey containers in groups, and means to control the operation of the valve gates, the transmitting devices and the exhaustion of gases in sequence for the delivery and discharge of the containers to and from the room.

38. In mechanisms of the character described, a vacuum controllable sealing room with sealing appliances therein, valve chambers delivering to and from said sealing room, vertically movable air-operated valve gates to open and close said chambers alternatively to said room and to the atmosphere, means to exhaust air from said chamber, conveying mechanisms for the delivery and discharge of containers through said chambers to and from the sealing room and its appliances, said conveying mechanisms comprising vertically and horizontally movable fluid operated transmitting devices to convey containers in groups, means to actuate the sealing appliances in cooperative relation with the conveying mechanisms, the control for the actuation of the valve gates, the transmitting devices and for the exhaustion of air to comprise valve elements operable in synchronism with the cycle of operation of the sealing appliances.

39. In mechanisms of the character described, an enclosed gas filled room for sealing containers under gas, sealing appliances therein, valve chambers through which containers pass to and from the enclosed space, and means to retrieve the gas passing into the valve chambers during the process of their operation.

40. In mechanisms of the character described, an enclosed gas filled room for sealing containers under gas, sealing appliances therein, valve chambers through which containers pass to and from the enclosed room, and means to transfer the gas from the valve chamber back into said room.

41. In mechanisms of the character described, an enclosed air free space for sealing containers, sealing appliances therein, an operable enclosure through which containers pass into the enclosed space, means, movable horizontally, to move a group of containers in single line formation in a horizontal direction through said enclosure, and movable vertically, to clear said containers, and return to its original position.

42. The method of conveying sealable containers through a changing atmosphere, comprising enclosing a plurality of filled containers, simultaneously exhausting air from the enclosed containers at a gradual rate to avoid disturbing contents, thereafter transferring the containers in a group into a space having a reduced atmospheric pressure and sealing said containers while in said space.

43. Apparatus for removing containers from an enclosed room under other than atmospheric conditions which comprises a chamber, means for alternately placing said chamber into communication with said room and isolating said chamber from said room, means for transferring containers from said room to said chamber, means for alternatively opening communication from said chamber to the atmosphere and closing said chamber from the atmosphere, means for removing said containers from said chamber to the atmosphere, means for gradually evacuating said chamber while closed from said room and from the atmosphere.

44. Apparatus for transferring containers to and from a room maintained under non-atmospheric conditions which comprises an inlet chamber and an outlet chamber for said room, means for alternatively and successively opening and closing said chambers to the atmosphere and to said room, means for evacuating air from said chambers between said opening periods, means to transfer containers to and from said room through said inlet and outlet chambers, respectively, separate timing means for said inlet and outlet chambers to control the opening and closing, transfer of containers and evacuation, and means for synchronously driving said timing means.

45. Apparatus for transferring containers to and from a room maintained under non-atmospheric conditions which comprises an inlet chamber and an outlet chamber for said room, fluid operated means for alternatively and successively opening and closing said chambers to the atmosphere and to said room, means for evacuating air from said chambers between said opening periods, fluid operated means to transfer containers to and from said room through said inlet and outlet chambers, respectively, separate timing means for said inlet and outlet chambers to control the opening and closing and transfer of containers and evacuation, and means for synchronously driving said timing means.

46. Apparatus for transferring containers to and from a room maintained under non-atmospheric conditions which comprises an inlet chamber and an outlet chamber for said room, means for alternatively and successively opening and closing said chambers to the atmosphere and to said room, means for evacuating air from said chambers between said opening periods, means to transfer containers to and from said room through said inlet and outlet chambers, respectively, and timing means to control the opening and closing and evacuation of said inlet and outlet chambers, and the passage of containers therethrough independently.

47. Apparatus for handling containers for treatment under selected gaseous condition which comprises a room and means to maintain said room under non-atmospheric conditions, an inlet chamber and an outlet chamber for said room, fluid operated means for alternatively opening said chambers to the atmosphere and to said room and closing said chambers between openings, means for evacuating air from said chambers while closed, means to group containers and to transfer said containers in groups through said inlet and outlet chambers, respectively, to and from said room, control means for timing the opening and closing and avacuating of air from said chambers and transfer of containers independently for said inlet and outlet chambers.

48. Apparatus for handling containers for treatment under selected gaseous condition which comprises a room, means for maintaining said room under a selected gaseous atmosphere, an inlet chamber and an outlet chamber for said room, fluid operated means to open and close said chambers alternatively to the atmosphere and to said room, means gradually to evacuate said chambers and admit a selected gas thereto while closed to atmosphere, means to withdraw gas from said chambers and admit air thereto while closed between an opening to the room and to the atmosphere, means to group containers for passage through said chambers, fluid operated means to transfer said containers in groups between atmosphere and chamber while open to atmosphere and between room and chamber while open to room, timing means to time the opening and closing and evacuation of said chambers and transfer means for independent operation of said inlet and outlet chambers.

49. A method of transferring filled containers under suitable atmospheric changes into a room which comprises moving said filled containers in upright position in single file into an aligned position, then moving a group of said aligned containers sidewise of their alignment, enclosing said group of containers, subjecting said group of containers to exhaustion of air to a high vacuum at a gradual rate to avoid disturbance of the material in said containers, then moving said group of containers sidewise of their alignment into the room and then moving them in single file.

50. A method of transferring filled containers under changes of atmosphere into a room having a select atmosphere which comprises moving said containers in single file into an aligned position, then moving a group of said containers sidewise of their position of alignment, enclosing the group thus moved from the atmosphere, subjecting the containers of said group to air exhaustion at a gradual rate, then admitting a selected atmosphere to said enclosed group of containers and moving said containers while enclosed from the atmosphere into said room.

51. A method of moving containers from a room under selected atmosphere which comprises moving said containers in said room in single file to aligned position, enclosing a group of said aligned containers all surrounded by said selected atmosphere, exhausting and retrieving the gas about said enclosed group of containers, admitting atmospheric air to said enclosed group of containers and then moving said group sidewise of their position of alignment.

52. Apparatus for moving containers into a room under change of atmospheric conditions which comprises a conveyor for conveying said containers in single file, means to position a group of said containers in aligned position, an inlet chamber, means to move said group of aligned containers sidewise of its position of alignment into said chamber, means to exhaust the air progressively from said chamber, a room, means to open said chamber to said room and means to move said group of containers from said chamber sidewise of their direction of alignment into said room.

53. Apparatus for transferring containers from a selected gaseous atmosphere which comprises a room under a selected atmosphere, an outlet chamber, means to open and close said outlet chamber to said room, a conveyor in said room to move containers in single file into aligned position for said outlet chamber, means to move said containers sidewise of their alignment in a group into said outlet chamber, means to exhaust and retrieve said selected gas from said chamber, means to admit air to said chamber means to open and close said chamber to the atmosphere and means to move said containers sidewise of their direction of alignment from said chamber to the atmosphere when said chamber is opened thereto.

54. Apparatus for transferring containers to a room with changes in the gaseous content which comprises a room, an inlet chamber for said room, a closure gate between said chamber and said room, a closure gate between the atmosphere and said chamber and movable to a distance from said chamber to permit the insertion of a container therebetween, a conveyor having means to align a group of containers in position between said movable gate and said container and on a level with the floor of said chamber, a pusher on said spaced gate to push a group of containers from said conveyor into said chamber, means to thereafter close said gate against said chamber to seal the latter from the atmosphere and a conveyor within said room at a level approaching the height of the floor of said chamber.

55. The apparatus of claim 54 in which said pusher is movable through said chamber to push a container from said chamber onto the conveyor within said room when the gate between said chamber and room is opened.

56. Apparatus for transferring containers to a room with changes in the gaseous content which comprises a room, an inlet chamber for said room, a closure gate between said chamber and said room, a closure gate between the atmosphere and said chamber and movable to a distance from said chamber to permit the insertion of a container therebetween, a conveyor having means to align a group of containers in position between said movable gate and said container and on a level with the floor of said chamber, a pusher on said spaced gate to push a group of containers from said conveyor into said chamber, means to thereafter close said gate against said chamber to seal the latter from the atmosphere and a conveyor within said room at a level approaching the height of the floor of said chamber and timed mechanism to withdraw said last-mentioned gate from said chamber to move a group of containers between said gate and said chamber and to the level of the floor of said chamber to move said pusher to push said containers into said chamber and then to close the gate against said chamber and open the gate between said chamber and said room and to further move said pusher to push said containers from said chamber onto the conveyor within said room.

57. Apparatus for transferring containers to a room with changes in the gaseous content which comprises a room, an inlet chamber for said room, a closure gate between said chamber and said room, a closure gate between the atmosphere and said chamber and movable to a distance from said chamber to permit the insertion of a container therebetween, a conveyor having means to align a group of containers in position between said movable gate and said container and on a level with the floor of said chamber, a pusher on said spaced gate to push a group of containers from said conveyor into said chamber, means to thereafter close said gate against said chamber to seal the latter from the atmosphere and a conveyor within said room at a level approaching the height of the floor of said chamber and timed mechanism to withdraw said last-mentioned gate from said chamber to move a group of containers between said gate and said chamber and to the level of the floor of said chamber to move said pusher to push said containers into said chamber and then to close the gate against said chamber and open the gate between said chamber and said room and to further move said pusher to push said containers from said chamber onto the conveyor within said room and to exhaust air from said chamber between the closing of said outer gate and the opening of the gate between said chamber and said room.

58. Apparatus of the type described which comprises a room, an inlet chamber, the wall of said chamber opposite said room being movable sidewise to a spaced distance from said chamber and means to move an aligned group of containers upwardly between said wall and said chamber to a sufficient height to slide onto the floor of said chamber.

59. Apparatus for transferring containers from atmosphere into a room under non-atmospheric conditions which comprises an inlet chamber having a wall at the inlet side of said chamber movable to a spaced distance from said chamber, conveyor mechanism for moving an aligned group of containers vertically to position between said wall and said inlet chamber, a pusher movable from said wall in its spaced position to push said containers onto the floor of said inlet chamber.

60. Apparatus for transferring containers from atmospheric into a room under non-atmospheric conditions which comprises an inlet chamber having a wall at the inlet side of said chamber movable to a spaced distance from said chamber, conveyor mechanism for moving an aligned group of containers vertically to position between said wall and said inlet chamber, a pusher movable from said wall in its spaced position to push said containers onto the floor of said inlet chamber, said conveyor mechanism comprising an endless belt to convey said containers in single file onto a raised platform and fluid operated means to lift such platform to position between said inlet chamber and said spaced wall.

61. Means for transferring containers to the atmosphere from a room under non-atmospheric conditions which comprises an outlet chamber, a closure cap between said chamber and said room and an outlet gate movable from the outlet side of said chamber to a spaced distance therefrom, a conveyor within said room at approximately the level of the floor of said outlet chamber, a pusher to push containers from said conveyor into the outlet chamber and a pusher within said outlet chamber movable to push said containers through the outlet side of said chamber.

62. Means for transferring containers to the atmosphere from a room under non-atmospheric conditions which comprises an outlet chamber, a closure cap between said chamber and said room and an outlet gate movable from the outlet side of said chamber to a spaced distance therefrom, a conveyor within said room at approximately the level of the floor of said outlet chamber, a pusher to push containers from said conveyor into the outlet chamber and a pusher within said outlet chamber movable to push said containers through the outlet side of said chamber, the said last-mentioned pusher being movable into a groove in the floor of said outlet chamber to permit the passage of containers thereover and then movable upwardly and outwardly to push said containers.

63. Apparatus for transferring containers to and from a room having other than the atmospheric gaseous condition which comprises inlet and outlet chambers, means to open said chambers alternatively to the atmosphere and to said room, means to exhaust gases from said chambers and a timing mechanism for each of said chambers to time the opening and closing and exhaustion of air to said chambers and a common driving means for said timers.

64. Apparatus for transferring containers to and from a room having other than the atmospheric gaseous condition which comprises inlet and outlet chambers, means to open said chambers alternatively to the atmosphere and to said room, means to exhaust gases from said chambers and a timing mechanism for each of said chambers to time the opening and closing and exhaustion of air to said chambers and a common driving means for said timers, said exhaust means having a set of control valves operated in timed sequence.

65. The method of treating filled containers which comprises vacuumizing and thereafter gasing a series of filled containers simultaneously, subsequently sealing the containers of the series in succession, assembling the containers into the same series after being closed and thereafter removing the containers simultaneously.

66. The method of treating filled containers which comprises vacuumizing a group of filled containers simultaneously, thereafter sealing the containers of the group one at a time, assembling the containers into the same group after sealing, treating the group of sealed containers thereafter and subsequently removing the containers in a group.

67. The method of subjecting filled containers to a selected gas, comprising subjecting a group of filled and open containers to the stages of vacuumization and a selected gas treatment, thereafter entering this group into a room having a selected gas, sealing the group of containers in said room, isolating the group of containers from said room thereafter, and subjecting the group of containers to the conditions of the atmosphere before removal of the group.

68. Apparatus for transferring containers to and from a room maintained under non-atmospheric conditions which comprises an inlet chamber and an outlet chamber for said room, means to alternatively and successively change the conditions of said chambers to the condition of the atmosphere and of said room, to open and close said chambers to the atmosphere and to said room, means to transfer containers to and from said room through said inlet and outlet chambers, respectively, separate timing means for said inlet and outlet chamber to control the opening and closing, the change of gaseous conditions and the transfer of containers, and means for synchronously driving said timing means.

69. Apparatus for transferring containers to and from a room maintained under non-atmospheric conditions which comprises an inlet chamber and an outlet chamber for said room, means to alternatively and successively change the conditions of said chambers to the condition of the atmosphere and of said room, to open and close said chambers to the atmosphere and to said room through said inlet and outlet chambers, respectively, and timing means to control the opening and closing and change of conditions of said inlet and outlet chambers and the passage of containers therethrough independently.

70. Apparatus for supplying containers to an enclosed room under other than atmospheric conditions which comprises a chamber, means for isolating said chamber from said room, means to change the condition of said chamber to the condition of the atmosphere, means to place said chamber in communication with the atmosphere, means for transferring containers from the atmosphere to said chamber, means for isolating said chamber from the atmosphere, means to change the atmospheric condition of said chamber to the condition of said room and to place said chamber in communication with said room, means to transfer said containers from said chamber to said room, and means to time said operations.

71. Apparatus for sealing filled containers which comprises a sealing room, a capping machine in said sealing room, an inlet chamber and an outlet chamber for said sealing room, each of said chambers having a gate opening to said sealing room and a gate opening to atmosphere, and a common motor to drive said capping machine and to close the gates at each chamber alternately.

72. Apparatus for sealing filled containers which comprises a sealing room, a capping machine in said sealing room, an inlet chamber and an outlet chamber for said sealing room, each of said chambers having a gate opening to said sealing room and a gate opening to atmosphere, means to convey containers through said inlet chamber into said sealing room and to said capping machine, means to convey sealed containers from said capping machine through said outlet chamber to the atmosphere, and a common motor to drive said capping machine and to close the gates at each chamber alternately.

73. Apparatus for transferring filled containers from atmosphere to a sealing room which comprises a transfer chamber, a platform in front of said transfer chamber, means to convey sealed containers to said platform, a pair of gates for said transfer chamber, one of said gates being between said chamber and said sealing room and the other between said chamber and atmosphere, means to transfer a group of containers from said platform to said chamber when the outer of said gates is opened, means to transfer containers from said chamber to said room when the outer of said gates is closed and the inner gate is opened, and a master control means for operating said conveyors and said gates in timed sequence.

74. The apparatus of claim 73 in which said gates and conveyor mechanisms are pneumatically operated and in which said master control valve comprises a rotating valve.

75. Apparatus for transferring filled containers to a sealing room which comprises a transfer chamber having a gate opening to said sealing room and an outer gate between said chamber and atmosphere, a platform to receive filled containers, means to lift said platform to a level with the floor of said transfer chamber, and means to push containers from said raised platform into said transfer room.

76. Apparatus for transferring filled containers to a sealing room which comprises a transfer chamber having a gate opening to said sealing room and an outer gate between said chamber and atmosphere, a platform to receive filled containers, means to lift said platform to a level with the floor of said transfer chamber, means to push containers from said raised platform into said transfer room, and means for pushing said containers from said transfer chamber into said sealing room.

77. Apparatus for aligning and transferring a group of containers to a sealing room which comprises a transfer chamber, a platform below the level of said transfer chamber, a rail enclosure to receive and align said group of containers, means to lift said platform to bring the containers above said rail enclosure to the level of said transfer chamber, and means for transferring said containers from said raised platform into said transfer chamber.

78. A sealing apparatus which comprises a sealing room, an entrance chamber to said room, a vertically sliding gate separating said entrance chamber from said room, a closure plate for said entrance chamber movable horizontally outwardly from said chamber to permit a container to be lifted into position between said closure plate and said chamber, and means to align a group of containers and lift them into position between said closure plate and said chamber whereby said containers are pushed into said chamber when said closure plate is brought into closing position.

79. A sealing apparatus which comprises a sealing room, an entrance chamber to said room, a vertically sliding gate separating said entrance chamber from said room, a closure plate for said entrance chamber movable horizontally outwardly from said chamber to permit a container to be lifted into position between said closure plate and said chamber, means to align a group of containers and lift them into position between said closure plate and said chamber whereby said containers are pushed into said chamber when said closure plate is brought into closing position, means to lift said vertically sliding gate, and means to push said containers from said chamber into said room.

80. A sealing apparatus which comprises a sealing room, an entrance chamber to said room, a vertically sliding gate separating said entrance chamber from said room, a closure plate for said entrance chamber movable horizontally outwardly from said chamber to permit a container to be lifted into position between said closure plate and said chamber, means to align a group of containers and lift them into position between said closure plate and said chamber whereby said containers are pushed into said chamber when said closure plate is brought into closing position, said container aligning mechanism comprising a platform below and in front of said chamber, a conveyor mechanism for conveying containers onto said platform, a turnstile having arms in the path of containers passing to said platform, means to stop said turnstile upon the passage of a predetermined number of containers, and means to lift said platform to the level of said chamber and to release said turnstile.

81. Apparatus for sealing containers which comprises a sealing room, an entrance chamber thereto, means to close said entrance chamber from said sealing room, a closure for the inlet side of said entrance chamber movable to spaced position from said chamber, a platform below the space between said closure and said chamber, said platform having a pair of longitudinally spaced rails, a conveyor mechanism having conveying strips between said rails, means to stop a group of containers conveyed on said platform by said conveyor mechanism, means to lift said platform above said conveyor to the level of the floor of said chamber, and means to move said closure to push said containers into said chamber.

82. Apparatus for transferring containers into a sealing room which comprises an entrance chamber, a closure plate movable from the entrance end of said chamber to a sufficient distance to receive a container therebetween, means to move said closure to closed position and thereby to push a container into said chamber, a pusher rod on the inner side of said closure, and means to push said pusher rod through said chamber to transfer said container to said sealing room.

83. Apparatus for capping and sealing filled containers which comprises a sealing room under other than atmospheric conditions, capping means in said room, means for supplying filled containers in said room to said capping means, means for transferring a number of filled containers to said room in a corresponding number of separate non-consecutive paths of travel whereby the rate of transfer of each container is equal to the rate of supply to said capping machine divided by said number of paths and the number of containers supplied to said room equals the number supplied to said capping machine in a period of time and means for changing the gaseous conditions in said containers from atmosphere to that of said sealing room while being transferred thereto.

84. A method of closing filled containers which comprises transferring said containers in parallel relation to a changed atmosphere, changing the gaseous contents of said containers during said passage to that of said changed atmosphere, capping said containers in said changed atmosphere in succession in time periods equal to those in which said containers are transferred to said atmosphere divided by the number of containers introduced in parallel relation whereby as many containers are closed as are introduced.

W. MILES RYAN.
JOHN W. BOLD.